(12) United States Patent
Yamaguchi

(10) Patent No.: US 12,154,090 B2
(45) Date of Patent: Nov. 26, 2024

(54) SALES AREA MANAGEMENT SYSTEM WITH GATE DEVICE

(71) Applicant: TOSHIBA TEC KABUSHIKI KAISHA, Tokyo (JP)

(72) Inventor: Kiyomitu Yamaguchi, Izunokuni Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 326 days.

(21) Appl. No.: 17/586,464

(22) Filed: Jan. 27, 2022

(65) Prior Publication Data

US 2022/0391871 A1     Dec. 8, 2022

(30) Foreign Application Priority Data

Jun. 7, 2021   (JP) ................................ 2021-095077

(51) Int. Cl.
    *G06Q 20/20*        (2012.01)
    *G06Q 20/02*        (2012.01)

(52) U.S. Cl.
    CPC ......... *G06Q 20/208* (2013.01); *G06Q 20/027* (2013.01)

(58) Field of Classification Search
    CPC ... G06Q 20/208; G06Q 20/027; G06Q 10/087
    USPC ...................................... 705/23, 28
    See application file for complete search history.

(56) References Cited

FOREIGN PATENT DOCUMENTS

| JP | 2000123257 A | * | 4/2000 |
|---|---|---|---|
| JP | 2017187911 A | * | 10/2017 |
| KR | 20160015971 A | | 2/2016 |

OTHER PUBLICATIONS

Korean Office Action dated Mar. 25, 2024, mailed in counterpart Korean Application No. 10-2022-0006989, 12 pages (with translation).

\* cited by examiner

*Primary Examiner* — Ariel J Yu
*Assistant Examiner* — Denisse Y Ortiz Roman
(74) *Attorney, Agent, or Firm* — Kim & Stewart LLP

(57) ABSTRACT

A sales area management system includes an accounting device and a gate device. The accounting device acquires transaction information and executes accounting processing based on the transaction information. The accounting device receives the number of people associated with the transaction information and outputs payment completion information along with the associated number of people. The gate device includes receives the payment completion information and the associated number of people and detects the number of customers passing through the gate device. A notification control unit of the gate device causes a notification unit to indicate the remaining number of people corresponding to the associated number of people minus the detected number of people passing the gate. The gate device outputs error information when the detected number exceeds the associated number of people for the transaction.

20 Claims, 17 Drawing Sheets

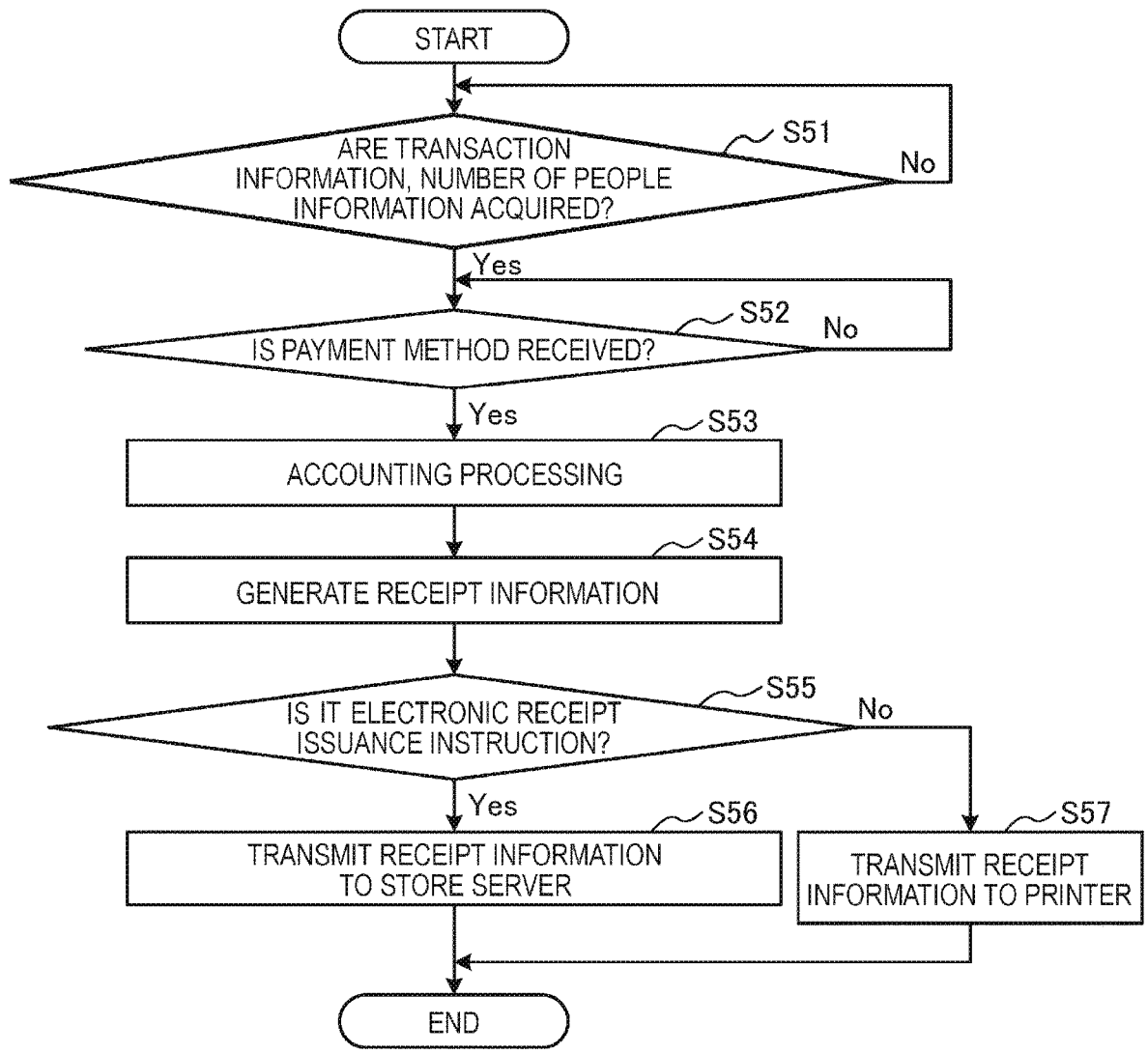

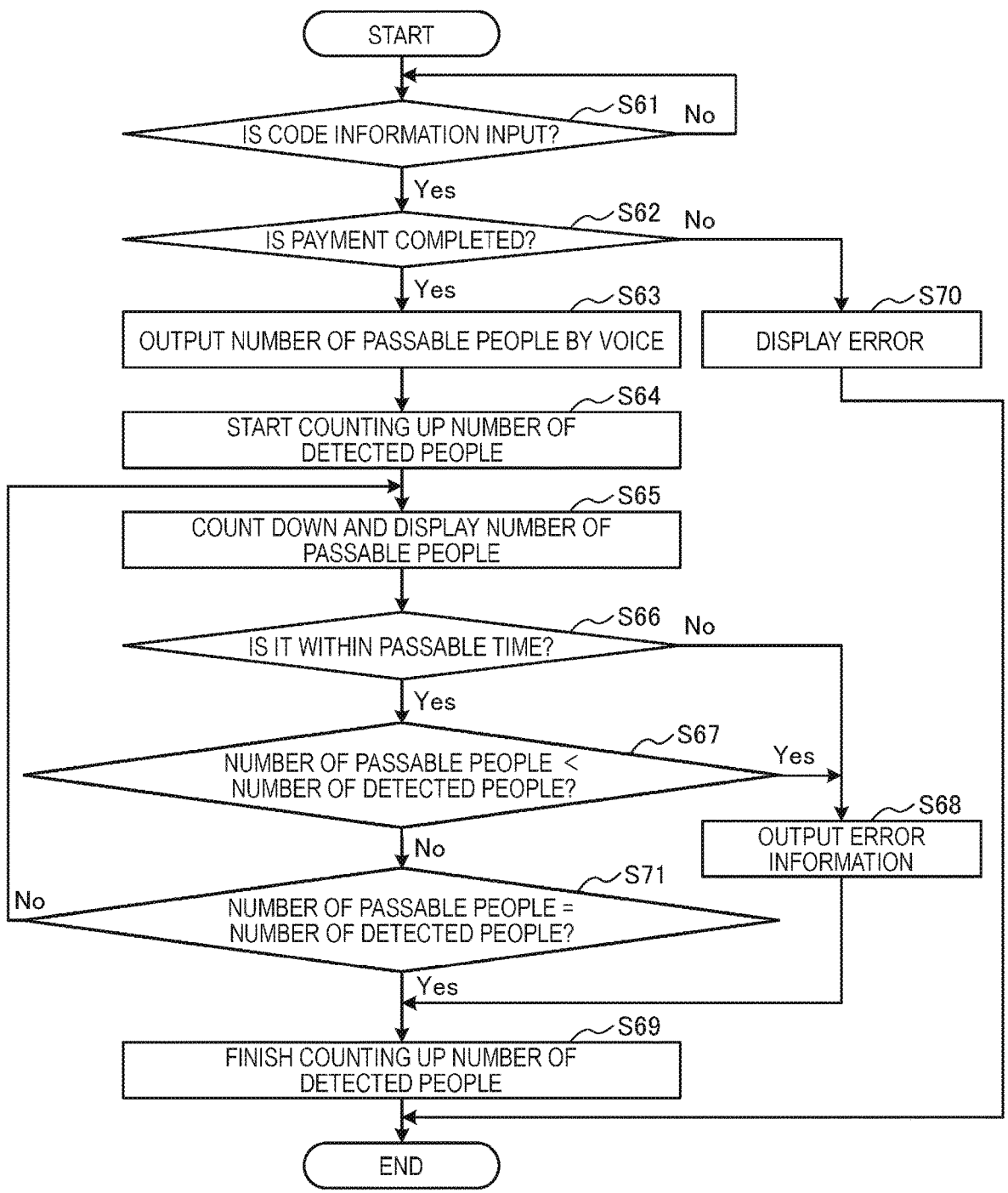

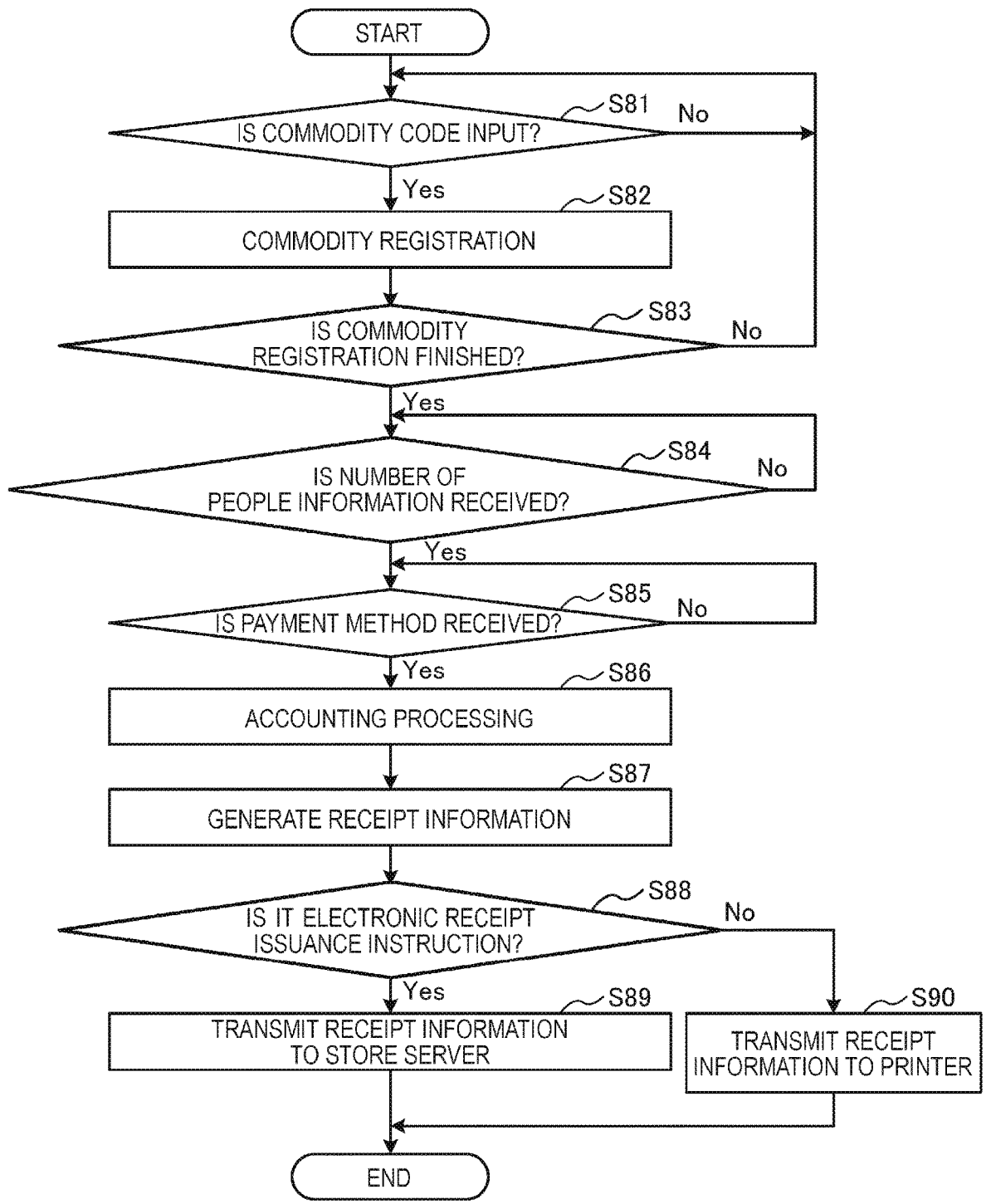

SALES AREA MANAGEMENT SYSTEM WITH GATE DEVICE

CROSS-REFERENCE TO RELATED APPLICATION

This application is based upon and claims the benefit of priority from Japanese Patent Application No. 2021-095077, filed Jun. 7, 2021, the entire contents of which are incorporated herein by reference.

FIELD

Embodiments of the present disclosure relate generally to a sales area management system with a gate or gate-like device for controlling exiting from the sales area or the like.

BACKGROUND

In recent years, in stores such as supermarkets and big retailer stores, an accounting device at which a customer who is purchasing items and/or services (hereinafter collectively referred to as a "product") makes a payment by operating the device by himself or herself has been put into practical use in view of potential labor shortages and the like. Such an accounting device may be a self-service POS (Point of Sales) terminal with which the customer performs both product registration and payment or a semi-self service POS accounting device with which a customer just makes a payment based on transaction information that a clerk has generated by a product registration operation.

In a store where such accounting devices are installed, a gate device is typically provided at the exit of an accounting area in which the accounting device has been installed in order to prevent customers from leaving the store without making a payment. The gate device may read a barcode printed on a receipt issued by the accounting device after customer payment to confirm that the customer has completed payment. After confirming the barcode, the gate allows the customer to pass. A customer who has paid correctly can normally leave the accounting area (hereinafter, also referred to as "normal exit") without the gate device performing any abnormality processing.

It has also been proposed that a barcode containing number of people information be printed on a receipt and the gate device can check the number of people so that the customers in a group who make one transaction as a group (e.g., a plurality of people such as family members and friends) can leave normally. However, when there is more than one customer group in the accounting area attempting to pass through the gate device at the same time (or nearly so), the gate device may not be able correctly check the number of group customers, and there is a problem that it is difficult for the customer groups to smoothly pass through the gate device.

BRIEF DESCRIPTION OF DRAWINGS

FIG. 15 is a flowchart illustrating a processing flow of a control unit of an accounting device.

FIG. 16 is a flowchart illustrating a processing flow of a control unit of a gate device.

FIG. 17 is a flowchart illustrating a processing flow of a control unit of a self-service POS terminal.

DETAILED DESCRIPTION

Figure 1:
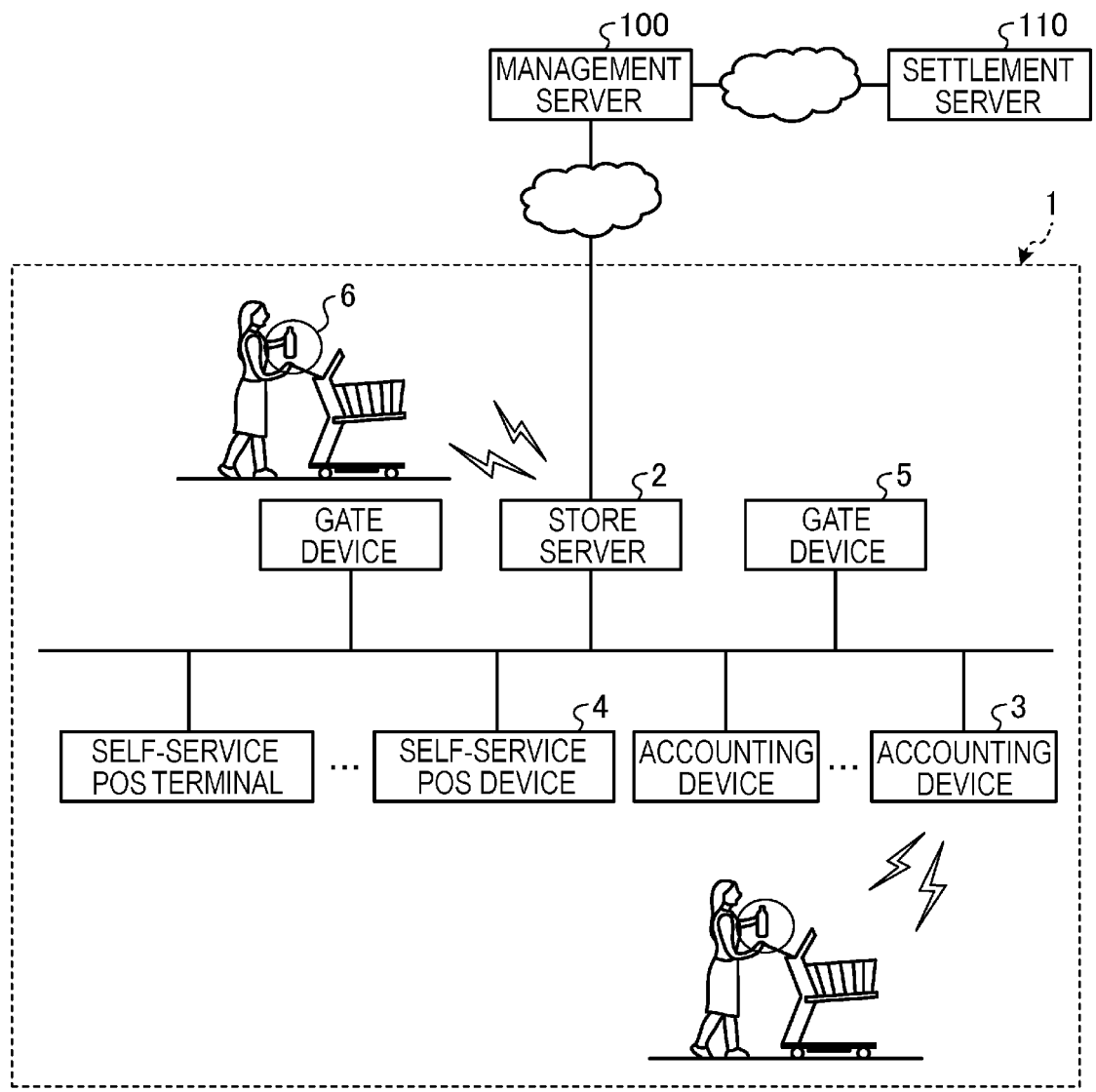
FIG. 1 depicts a system including a sales area management system of an embodiment.

In general, according to one embodiment, there is provided a sales area management system that enables customers and customer groups to smoothly pass through a gate device of the sales management system.

According to one embodiment, a sales management system includes an accounting device configured to execute an accounting process for a customer purchasing a product in a sales transaction based on input operations by the customer. The system also includes a gate device through which customers pass after completing the accounting process. The accounting device has an acquisition unit configured to acquire transaction information for the sales transaction, an accounting processing unit configured to execute the accounting processing based on the transaction information acquired by the acquisition unit, a people number receiving unit configured to receive people information indicating the number of people associated with the transaction information, and an output unit configured to output payment completion information indicating that payment related to the transaction information has been completed together with the people information received by the people number information receiving unit after the accounting processing unit completes the accounting processing. The gate device has an input unit configured to receive the payment completion information and the people information from the output unit, a detection unit configured to detect people passing through the gate device, a notification control unit configured to causes a notification unit to indicate the remaining number of people corresponding to the people information minus the number of people detected by the detection unit passing through the gate device, and an error information output unit configured to output error information when the number of people detected by the detection unit exceeds the number of people indicated by the people information.

Hereinafter, a sales area management system of certain example embodiments will be described. The present disclosure is not limited to the specific example embodiments described below. As an accounting device in an embodiment, an accounting device may be a device that receives transaction information from a portable terminal, which executes commodity registration, and/or executes an accounting process. For example, the accounting device may be a self-service POS terminal, which may also be referred to as a self-checkout terminal or kiosk in some instance. Such a self-service POS terminal executes commodity registration and the accounting process. The accounting device may be a portable terminal that executes commodity registration operations and a credit settlement process or the like, but the accounting device is not limited to such examples. The accounting device may be any device that executes the accounting processing by an operation of a customer purchasing a commodity or product. Furthermore, a gate device of an embodiment outputs an error message by voice, sound, or display when it is recognized that the customer passing through the gate device does not perform normal exit, but, in other examples, the gate device may have an opening and closing door or the like to control customer exiting.

A sales management device of an example embodiment will be described with reference to the drawings. FIG. 1 is a diagram illustrating an overall system in which a sales area management system 1 can be incorporated. The larger system of which the sales area management system 1 is a part includes a management server 100 and a settlement server 110 connected via a network such as the Internet to the sales management system 1.

The management server 100 stores various information for a plurality of different stores. For example, the management server 100 stores a member information management file for managing member information on a per store basis or otherwise. The member information management file is, for example, a file obtained by correlating a customer ID that specifies a customer, credit information, an email address, and the like with one another. The management server 100 acquires the member information management file from the customer when the customer registers as a member. Further, the management server 100 is connected to the settlement server 110 managed by a payment agent via a network such as the Internet. With this configuration, the sales area management system 1 can execute the accounting processing related to credit settlement by transmitting the customer ID and transaction information together with a settlement request to the management server 100.

The sales area management system 1 is applied to a store that sells commodities, for example, a supermarket. The sales area management system 1 includes a store server 2, a plurality of accounting devices 3, a plurality of self-service POS terminals 4, a plurality of gate devices 5, and a portable terminal 6 owned by the customer. The store server 2, the accounting device 3, the self-service POS terminal 4, and the gate device 5 are communicably connected to each other via a network such as a local area network (LAN). The portable terminal 6 is communicably connected to the store server 2 and the accounting device 3 via a wireless LAN or the like.

The store server 2 receives commodity information about the items on which the accounting processing has been executed and also settlement information related to a settlement method from the accounting device 3, the self-service POS terminal 4, and/or the portable terminal 6. The store server 2 receives sales information indicating a sales amount from the accounting device 3, the self-service POS terminal 4, and/or the portable terminal 6. The store server 2 manages sales at one particular store by centrally managing received commodity information, settlement information, sales information, and the like.

The store server 2 stores a commodity master (product master file). The commodity master is a file in which a commodity code, which is commodity identifying information, and commodity information (commodity name, price, and the like) are correlated with each other for the commodities handled in the store. When the store server 2 receives an inquiry about the commodity code from the portable terminal 6, the store server 2 reads the commodity information corresponding to the commodity code from the commodity master and transmits the commodity information to the portable terminal 6. Since the commodities handled in the store may change regularly, the commodity master can be updated as appropriate. The store server 2 can transmit the updated commodity master to the self-service POS terminal 4.

The accounting device 3 is a so-called self-service type accounting device with which a customer performs an accounting operation by himself or herself. The accounting device 3 executes the accounting processing related to payment by cash settlement or cashless settlement such as credit settlement, based on transaction information received from the portable terminal 6 or otherwise. The accounting processing is a process for making a payment for the items being purchased by the customer. The accounting processing is, for example, display of transaction information, calculation of change amount due, dispensing of change, and the like in cash settlement, and includes transmitting and receiving various information to and from the settlement server 110 via the store server 2, the management server 100, or the like in a credit settlement. The transaction information is information necessary for the accounting device 3 to execute the accounting process, and includes the commodity information such as a commodity name and a price of an item being purchased by the customer.

The self-service POS terminal 4 is a POS terminal that executes commodity registration and the accounting processing by an operation of the user. In other words, the self-service POS terminal 4 functions as both a commodity registration device and an accounting device. The commodity registration is performed to register the commodity information of the items being purchased by the customer. In general, the commodity registration is executed by reading the commodity code from a code symbol (such as a barcode) attached to the commodity. The commodity code can be read with a scanner or input via a touch panel or the like.

The gate device 5 is disposed near the exit of the accounting area in which the accounting device 3 and/or the self-service POS terminal 4 are installed. When information indicating that the customer has completed payment is read by the gate device 5, the gate device 5 allows the customer to leave the accounting area normally. The gate device 5 executes an error process when a customer for whom it cannot be confirmed that payment has been completed tries to pass through. The error process includes, for example, broadcasting a voice notification, sending a notification to a clerk assigned to the accounting area, and the like. When the gate device 5 is provided with an opening and closing door, the error process may be to close the door. In the example embodiment, voice notification is employed for the error process. This is because closing the door and forcibly prohibiting the passage of a customer may tend to cause discomfort to the customer in a normal retail setting.

The portable terminal 6 is owned by the customer in this example. That is, the portable terminal 6 is a personal device of the customer such as a smartphone. In other examples, the portable terminal 6 can be, a store-owned terminal device such as a tablet terminal, or the like provided specifically for use in the store.

An application program for shopping is installed on the portable terminal 6. The portable terminal 6 can perform commodity registration by photographing a code symbol such as a barcode attached to the commodity with a camera. The portable terminal 6 can transmit transaction information including commodity information for the registered items to the accounting device 3. The customer can then make a payment with a separate accounting device 3. Furthermore, the portable terminal 6 can, in some examples, transmit the transaction information and the customer ID directly to the store server 2. With this configuration, a customer who has registered member information in the management server 100 can make a payment via the portable terminal 6 without using the separate accounting device 3. In other words, the portable terminal 6 can execute not only commodity registration but also the accounting processing related to credit settlement, and thus functions as both a registration device and an accounting device. That is, the portable terminal 6 can be an example of the accounting device of an embodiment.

Figure 2:
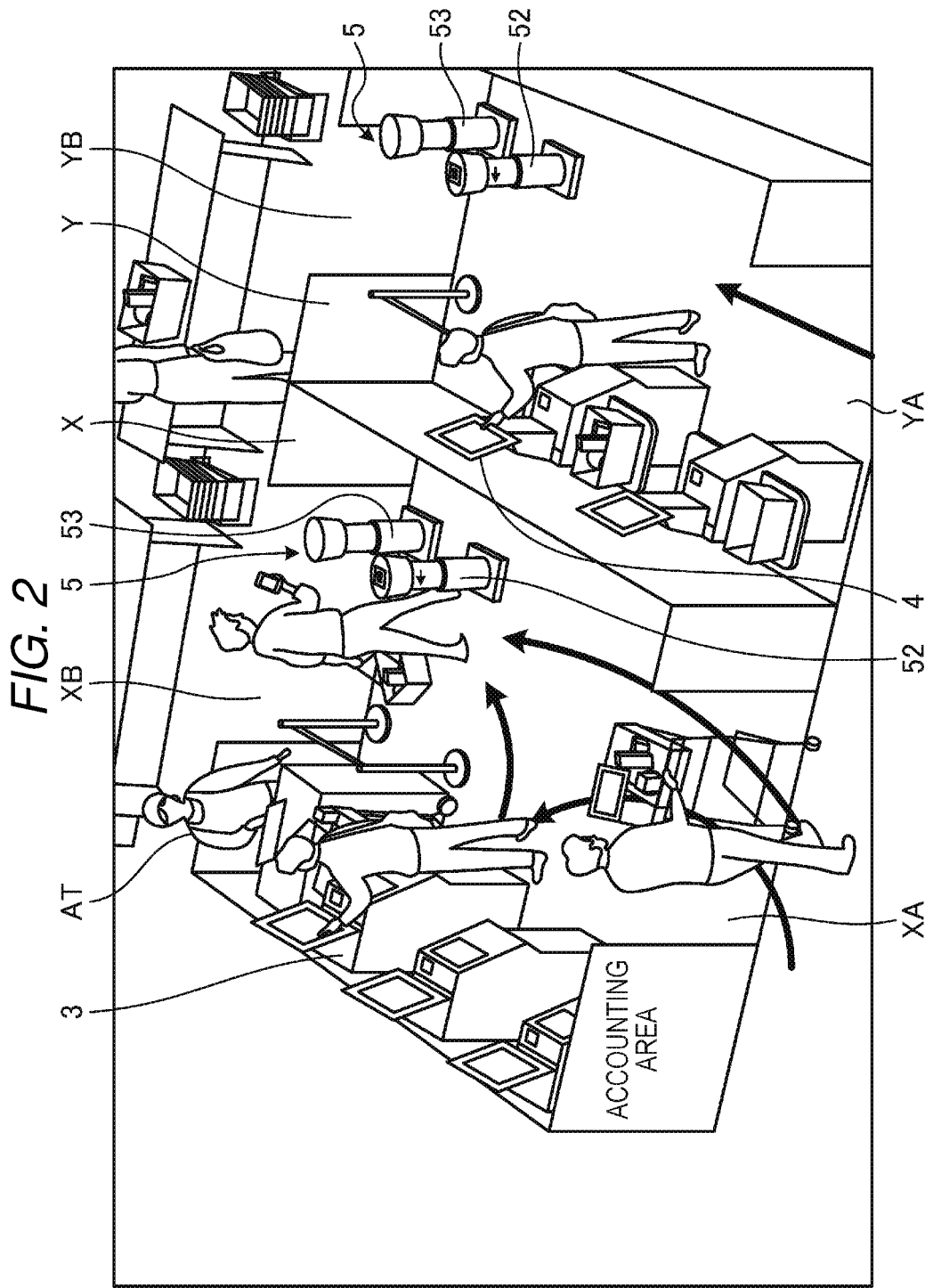
FIG. 2 is a diagram illustrating an accounting area in a store.

FIG. 2 is a diagram illustrating an example of an accounting area provided in a store. The accounting area is an area in which the accounting device is installed so that the customer can make a payment by his or her own operation. Even if settlement is completed with the portable terminal 6, the customer passes through the accounting area and leaves the store. In this embodiment, a first accounting area X and a second accounting area Y are provided. Although not specifically illustrated, a plurality of accounting lanes in which POS terminals operated by a clerk are installed can be provided in parallel with the first accounting area X and the second accounting area Y.

A plurality of accounting devices 3 are installed in the first accounting area X. Further, the first accounting area X is provided with an entrance XA and an exit XB. A gate device 5 is disposed near the exit XB. The gate device 5 includes a reading gate 52 and a sensor gate 53.

The reading gate 52 is disposed closer to the entrance XA than the sensor gate 53. The reading gate 52 includes a code reader 54 (see FIG. 9) that reads information from a barcode printed on a receipt issued by the accounting device 3 or a barcode included in an electronic receipt displayed on a display unit of the portable terminal 6. The reading gate 52 also includes a display unit 55 (see FIG. 9). Information read by the code reader 54 can be payment completion information indicating that the customer has completed payment, number of people information indicating the number of the customers (in a group), and other information. The display unit 55 displays various information relevant to the customers and/or store clerks.

The sensor gate 53 includes a passage sensor 56 that detects a passing customer and a voice output unit 57 (FIG. 9) such as a speaker. The passage sensor 56 detects when a customer (person) moves from the reading gate 52 side to the exit XB side. Various sensor types can be used as the passage sensor 56. The voice output unit 57 provides information to the customer(s) passing through the gate device 5, the other customer(s) in the accounting area, and an attendant AT. The attendant AT supports the operation of the accounting device(s) 3 and the self-service POS terminal(s) 4 for the customer in the first accounting area X and the second accounting area Y, and monitors the customer for fraudulent activity. The passage sensor 56 may be provided separately from the sensor gate 53, but in this example, the gate device 5 is configured to include the passage sensor 56.

A plurality of self-service POS terminals 4 are installed in the second accounting area Y. In the second accounting area Y, similar to the first accounting area X, an entrance YA and an exit YB are provided, and a gate device 5 is disposed. The second accounting area Y is generally the same configuration as the first accounting area X except that the accounting device installed therein is a self-service POS terminal 4 and no attendant AT is provided.

Figure 3:
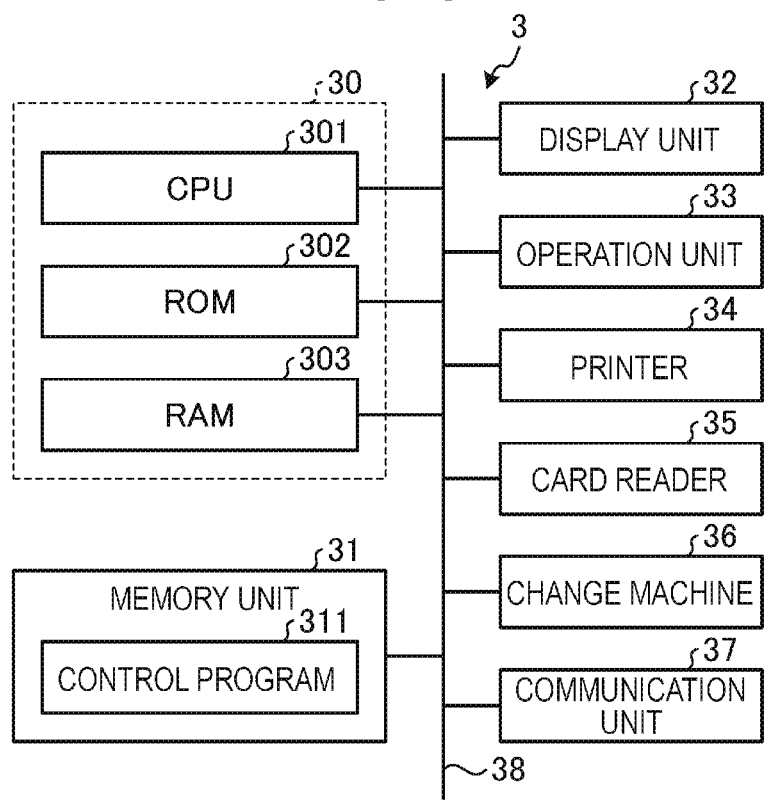
FIG. 3 is a block diagram illustrating a hardware configuration of an accounting device.

First, the accounting device 3 will be described. FIG. 3 is a block diagram illustrating a hardware configuration of the accounting device 3. The accounting device 3 includes a control unit 30, a memory unit 31, a display unit 32, an operation unit 33, a printer 34, a card reader 35, a change machine 36, and a communication unit 37. The control unit 30, the memory unit 31, the display unit 32, the operation unit 33, the printer 34, the card reader 35, the change machine 36, and the communication unit 37 are connected to each other via a bus 38 or the like.

The control unit 30 can be a computer provided with a central processing unit (CPU) 301, a read only memory (ROM) 302, and a random access memory (RAM) 303. The CPU 301, ROM 302, and RAM 303 are connected to each other via the bus 38.

The CPU 301 controls the overall operation of the accounting device 3. The ROM 302 stores various programs such as a program used to drive the CPU 301 and various data. The RAM 303 is used as a work area of the CPU 301, and various programs and various data stored in the ROM 302 or the memory unit 31 are loaded in the RAM 303. The control unit 30 executes various control processes of the accounting device 3 by operating the CPU 301 according to a control program stored in the ROM 302 or the memory unit 31 and loaded in the RAM 303.

The memory unit 31 is a storage medium such as a hard disk drive (HDD) or a flash memory, and maintains the stored contents even when power is interrupted. The memory unit 31 stores a control program 311.

The control program 311 is a program for executing the accounting process, a program for generating a barcode indicating payment completion information indicating that a customer has completed payment, or number of people information indicating the number of the customers, and a program for generating receipt information including the generated barcode.

The display unit 32 is, for example, a liquid crystal panel, and displays various information. The display unit 32 displays, for example, transaction information received from the portable terminal 6, an operator for operation by a customer who is a user, and the like. The operator displayed on the display unit 32 is, for example, an operation button for selecting a payment method such as cash settlement or credit settlement.

The operation unit 33 is, for example, a touch panel provided on a surface of the display unit 32, and outputs information according to a position touched by the user to the control unit 30. When the customer selects a button or key displayed on the display unit 32, the operation unit 33 outputs information corresponding to selection to the control unit 30.

The printer 34 is, for example, a thermal printer. The printer 34 prints transaction information and a barcode on a roll-shaped receipt paper and issues it as a receipt. The transaction information includes a transacted commodity name, price, total amount, and the like. The barcode indicates information including payment completion information indicating that the customer has completed the payment and number of people information indicating the number of customers.

The card reader 35 magnetically reads credit information required for settlement from a credit card. Further, the card reader 35 magnetically reads member information that specifies a member from a medium such as a member card or a point card. The card reader 35 may be an IC card reader that reads information from an IC card with a built-in integrated circuit (IC) chip.

When the customer pays a purchase price of the commodity in cash, the change machine 36 receives banknotes and coins paid by the customer and pays out the change as needed.

The communication unit 37 is an interface for communicating with an external device such as the store server 2, the self-service POS terminal 4, and the gate device 5. By being connected to the external device via the communication unit 37, the control unit 30 can transmit and receive information (data) to and from the external device.

Figure 4:
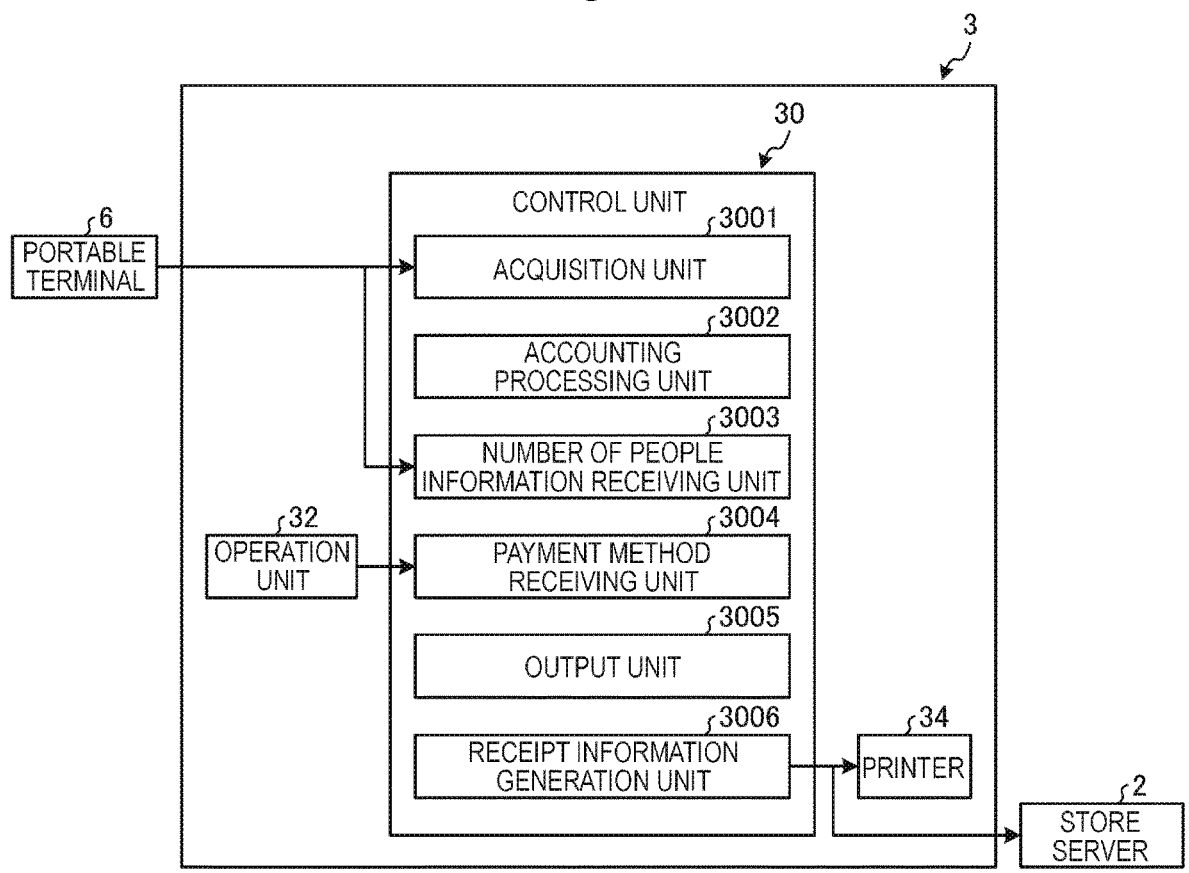
FIG. 4 is a block diagram illustrating a functional configuration of an accounting device.

Subsequently, a functional configuration of the control unit 30 of the accounting device 3 will be described. FIG. 4 is a block diagram illustrating a main functional configuration of the control unit 30 of the accounting device 3. By operating the CPU 301 according to the control program stored in the ROM 302 or the memory unit 31, the control unit 30 functions as an acquisition unit 3001, an accounting processing unit 3002, a number of people information receiving unit 3003, a payment method receiving unit 3004, an output unit 3005, and a receipt information generation unit 3006. Further, each of these functions may be configured by hardware such as a dedicated circuit.

The acquisition unit 3001 acquires transaction information of one transaction. Specifically, the acquisition unit 3001 receives transaction information based on commodity information of a commodity registered by the portable terminal 6 from the portable terminal 6.

The accounting processing unit 3002 executes the accounting processing based on the transaction information acquired by the acquisition unit 3001. The accounting processing unit 3002 displays, for example, the transaction information acquired by the acquisition unit 3001 on the display unit 32. Further, when the customer makes a payment by cash settlement, the accounting processing unit 3002 controls the change machine 36 to pay out the necessary change. When the customer makes a payment by credit settlement, the accounting processing unit 3002 reads the credit information by the card reader 35. Then, the accounting processing unit 3002 transmits and receives various information related to credit settlement to and from the settlement server 110 via the store server 2, the management server 100, and the like.

The number of people information receiving unit 3003 receives number of people information corresponding to the transaction information acquired by the acquisition unit 3001. Specifically, the number of people information receiving unit 3003 receives the number of people information from the portable terminal 6 as input at the portable terminal 6 by the customer. The number of people information is information indicating the number of customers involved in a shopping group making payment for a single transaction that corresponds to the transaction information acquired by the acquisition unit 3001. The number of people information in this context corresponds to those people in a shopping group who actually enter the first accounting area X or the second accounting area Y. The number of people information receiving unit 3003 may receive the number of people information from the customer operating the operation unit 33. In this case, the customer does not need to input the number of people information with the portable terminal 6.

The payment method receiving unit 3004 receives information indicating a payment method selection (hereinafter, also referred to as "payment method information") input by the customer, but only after the number of people information receiving unit 3003 has received the number of people information. Specifically, after the number of people information receiving unit 3003 receives the number of people information, the payment method receiving unit 3004 can receive the payment method information input by operation of the operation unit 33. When the payment method information is input while the number of people information receiving unit 3003 has not yet received the number of people information, the payment method receiving unit 3004 displays an error message such as "Please input the number of people and then select the payment method" on the display unit 32. The payment method receiving unit 3004 may receive the payment method information from the portable terminal 6. In this case, the customer does not need to input the number of people information into the operation unit 33. The payment method receiving unit 3004 also receives a receipt issuance method. The payment method receiving unit 3004 receives information indicating a paper receipt or an electronic receipt as selected by the customer.

When the accounting processing unit 3002 executes the accounting processing based on the transaction information, the output unit 3005 outputs the payment completion information indicating that the payment related to the transaction information is completed and the number of people information received by the number of people information receiving unit 3003. Specifically, when the accounting processing by the accounting processing unit 3002 is completed, the output unit 3005 outputs the payment completion information and the number of people information to the receipt information generation unit 3006. The payment completion information is information indicating that the customer's payment has been completed. For example, the payment completion information indicates accounting processing has been performed with an accounting device 3 by including a transaction No. that is issued by the accounting device 3 only after the accounting process is complete.

In this embodiment, the output unit 3005 outputs the payment completion information and the number of people information to the receipt information generation unit 3006 in order to issue a receipt including a barcode indicating both the payment completion information and the number of people information. When the accounting device 3 issues the barcode indicating the payment completion information and number of people information separately from the receipt, the output unit 3005 outputs the payment completion information and number of people information to the printer 34 or the store server 2. With this configuration, the printer 34 can print the barcode, or the store server 2 can transmit information capable of displaying the barcode to the portable terminal 6.

The receipt information generation unit 3006 generates receipt information for issuing a receipt. Specifically, the receipt information generation unit 3006 generates receipt information including the transaction information acquired by the acquisition unit 3001 and the payment completion information and the number of people information output by the output unit 3005. The receipt information generation unit 3006 outputs the receipt information to the printer 34 or the store server 2. With this configuration, the printer 34 can print the receipt including the barcode indicating the payment completion information and the number of people information, and the store server 2 allows the electronic receipt including the barcode indicating the payment completion information and the number of people information to be browsed on the customer terminal such as a smartphone. When the portable terminal 6 is a customer terminal in which a shopping application program is installed, the customer terminal can acquire the receipt information from the store server 2 via a wireless LAN. Further, when the portable terminal 6 is a tablet terminal provided by the store, the customer terminal can acquire the receipt information via the management server 10 that stores the member information including an e-mail address.

Figure 5:
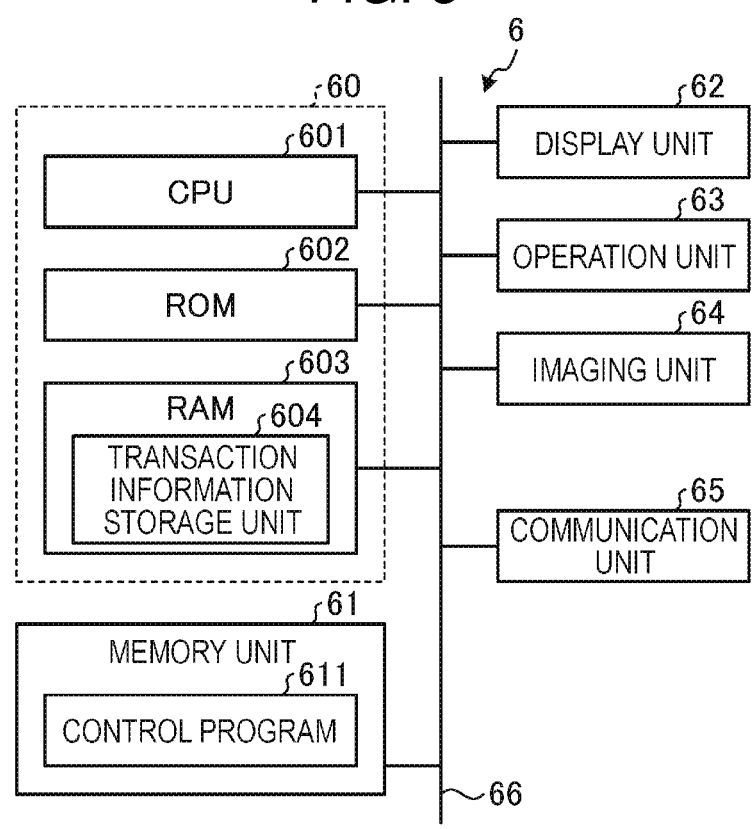
FIG. 5 is a block diagram illustrating a hardware configuration of a portable terminal.

FIG. 5 is a block diagram illustrating a hardware configuration of the portable terminal 6. The portable terminal 6 includes a control unit 60, a memory unit 61, a display unit 62, an operation unit 63, an imaging unit 64, and a communication unit 65. The control unit 60, the memory unit 61, the display unit 62, the operation unit 63, the imaging unit 64, and the communication unit 65 are connected to each other via a bus 66 or the like.

The control unit 60 can be a computer provided with a CPU 601, a ROM 602, and a RAM 603. The CPU 601, ROM 602, and RAM 603 are connected to each other via the bus 66.

The CPU 601 controls the overall operation of the portable terminal 6. The ROM 602 stores various programs such as a program used to drive the CPU 601 and various data. The RAM 603 includes a transaction information storage unit 604. The transaction information storage unit 604 is an area for storing transaction information including the commodity information and the like acquired from the store server 2 based on the input commodity code in one transaction. The RAM 603 is used as a work area of the CPU 601, and various programs and various data stored in the ROM 602 or the memory unit 61 are loaded in the RAM 603. The control unit 60 executes various control processes of the portable terminal 6 by operating the CPU 601 according to a control program stored in the ROM 602 or the memory unit 61 and loaded in the RAM 603.

The memory unit 61 is a storage medium such as an HDD or a flash memory, and maintains the stored contents even when power is interrupted. The memory unit 61 stores a control program 611.

The control program 611 is a shopping application program or the like, and causes the portable terminal 6 to function as a commodity registration device or an accounting device for executing the accounting processing related to credit settlement.

The display unit 32 is, for example, a liquid crystal panel, and displays various information. The display unit 32 displays, for example, the commodity information of the registered commodity, a total price of the registered commodities, and the like. Further, the display unit 32 displays various information such as an operator for the customer who is the user to operate it.

The operation unit 63 is, for example, a touch panel provided on a surface of the display unit 62, and outputs information according to a position touched by the user to the control unit 60. When the customer selects a button or key displayed on the display unit 62, the operation unit 63 outputs information corresponding to the operator to the control unit 60.

The imaging unit 64 takes a picture or acquires an image of a barcode attached to the commodity, a barcode displayed on the accounting device 3, or the like, and inputs the imaged data to the control unit 60. The control unit 60 reads the commodity code that identifies the commodity from an image of the barcode attached to the commodity. Further, the control unit 60 reads a payment code for transferring transaction data from the image of the barcode displayed on the accounting device 3. When the portable terminal 6 has a function of performing commodity registration using so-called object recognition, the imaging unit 64 images the appearance of the commodity and inputs the image to the control unit 60.

The communication unit 65 is an interface for communicating with the external device such as the store server 2, the accounting device 3, and the management server 100. By being connected to the external device via the communication unit 65, the control unit 60 can transmit and receive information (data) to and from the external device.

Figure 6:
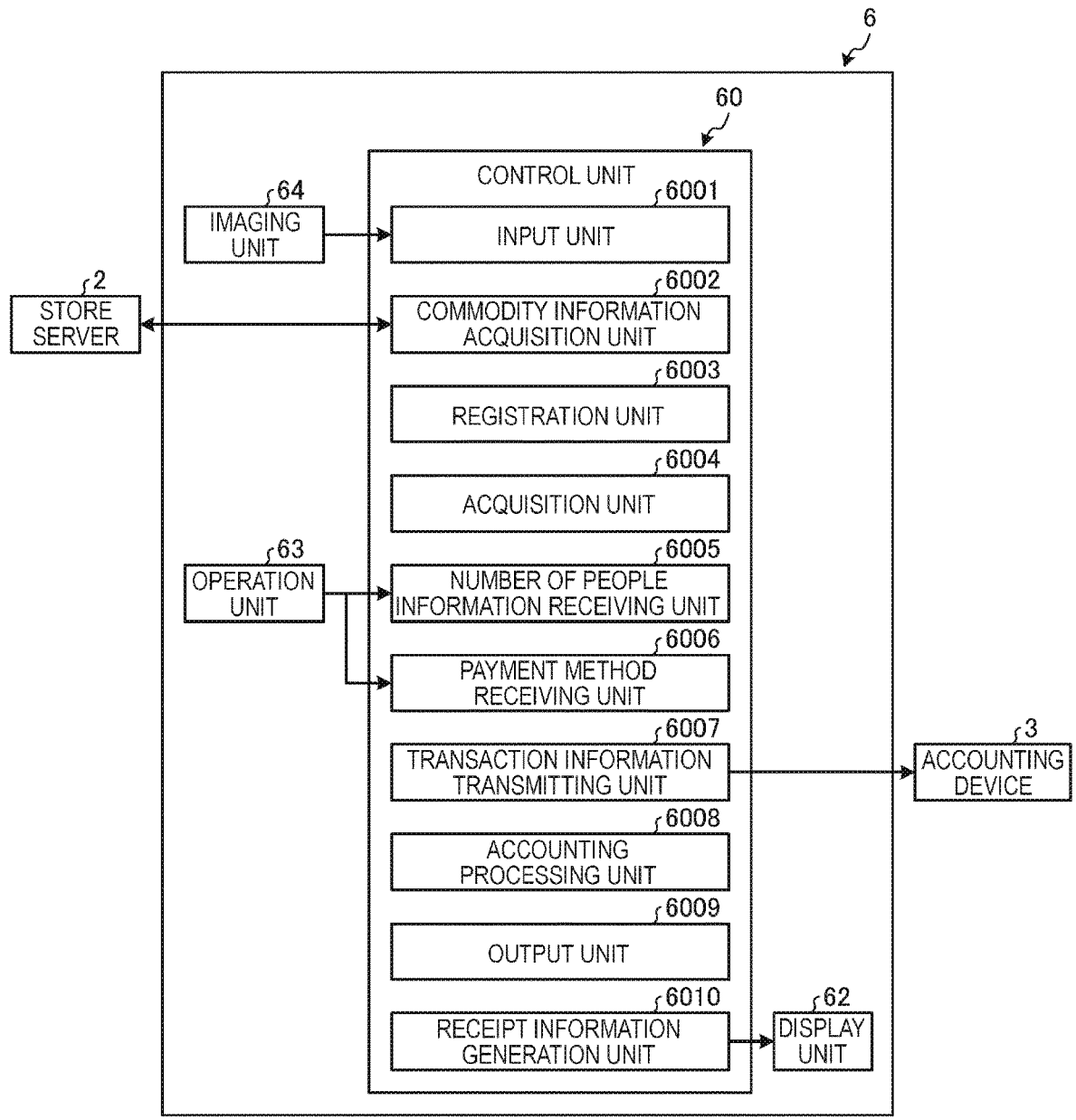
FIG. 6 is a block diagram illustrating a functional configuration of a portable terminal.

Subsequently, the functional configuration of the control unit 60 of the portable terminal 6 will be described. FIG. 6 is a block diagram illustrating a main functional configuration of the control unit 60 of the portable terminal 6. By operating the CPU 601 according to the control program stored in the ROM 602 or the memory unit 61, the control unit 60 functions as an input unit 6001, a commodity information acquisition unit 6002, a registration unit 6003, an acquisition unit 6004, a number of people information receiving unit 6005, a payment method receiving unit 6006, a transaction information transmitting unit 6007, an accounting processing unit 6008, an output unit 6009, and a receipt information generation unit 6010. Further, each of these functions may be configured by hardware such as a dedicated circuit.

The imaged data from the imaging unit 64 is sent to the input unit 6001. The input unit 6001 extracts a barcode from the imaged data and decodes the barcode. The input unit 6001 outputs the commodity code to the commodity information acquisition unit 6002 when the barcode indicates a commodity code and outputs a payment code to the transaction information transmitting unit 6007 when the barcode indicates a payment code.

The commodity information acquisition unit 6002 acquires commodity information from the store server 2 based on the commodity code from the input unit 6001. Specifically, the commodity information acquisition unit 6002 inquires of the store server 2 about the commodity code from the input unit 6001, and then acquires the commodity information extracted from the commodity master by the store server 2 based on the commodity code. The commodity master may be stored in the memory unit 61, and the commodity information acquisition unit 6002 may acquire the commodity information from the memory unit 61 rather than the store server 2 in some examples.

The registration unit 6003 executes commodity registration by registering the commodity information acquired by the commodity information acquisition unit 6002 in the transaction information storage unit 604. The commodity information may include the commodity code.

The acquisition unit 6004 acquires transaction information of one transaction. Specifically, when the payment method receiving unit 6006 receives payment method information, the acquisition unit 6004 reads the transaction information from the transaction information storage unit 604.

The number of people information receiving unit 6005 receives number of people information corresponding to the transaction information acquired by the acquisition unit 6004. Specifically, the number of people information receiving unit 6005 receives the number of people information input by the operation of the operation unit 63 by the customer.

The payment method receiving unit 6006 receives the payment method information input by the customer on condition that the number of people information receiving unit 6005 has received the number of people information. Specifically, when the number of people information receiving unit 6005 receives the number of people information, the payment method receiving unit 6006 receives the payment method information indicating payment by credit settlement input by the operation of the operation unit 63. The accounting processing executed by the portable terminal 6 is only the process related to credit settlement. Similar to the accounting device 3, when the payment method information is input while the number of people information receiving unit 6005 has not received the number of people information, the payment method receiving unit 6006 displays an error message on the display unit 62.

When a payment code is sent from the input unit 6001, or when a transaction information transfer instruction is sent from the operation unit 43, the transaction information transmitting unit 6007 transmits the transaction information stored in the transaction information storage unit 604 and the number of people information received by the number of people information receiving unit 6005 to the accounting device 3. When the customer images the barcode displayed on the accounting device 3 with the imaging unit 64 in order to make a payment with the accounting device 3, or when the transaction information transfer instruction is input by the operation unit 43, the transaction information and the number of people information are transmitted to the accounting device 3.

The accounting processing unit 6008 executes the accounting processing based on the transaction information acquired by the acquisition unit 6004. Specifically, when the payment method receiving unit 6006 receives the payment method information indicating payment by credit settlement, the accounting processing unit 6008 transmits and receives, as the accounting processing for credit settlement, various information related to credit settlement to and from the settlement server 110 via the store server 2, the management server 100, and the like. The information transmitted by the accounting processing unit 6008 to the store server 2 includes the transaction information and customer ID. When making a credit settlement by operating the portable terminal 6, it is not necessary to read the credit card.

When the accounting processing unit 6008 executes the accounting processing based on the transaction information, the output unit 6009 outputs the payment completion information indicating that the payment related to the transaction information is completed and the number of people information received by the number of people information receiving unit 6005. Specifically, when the accounting processing by the accounting processing unit 6008 is completed, the output unit 6009 acquires the transaction No. issued by the store server 2 from the store server 2, and outputs the transaction No. as payment completion information together with the number of people information to the receipt information generation unit 6010.

The receipt information generation unit 6010 generates receipt information for issuing a receipt. Specifically, the receipt information generation unit 6010 generates receipt information including the transaction information acquired by the acquisition unit 6004, and the payment completion information and number of people information output by the output unit 6009. The receipt information generation unit 6010 outputs the generated receipt information to the display unit 62. The display unit 62 displays an electronic receipt including a barcode indicating the payment completion information and the number of people information based on the receipt information.

Figure 7:
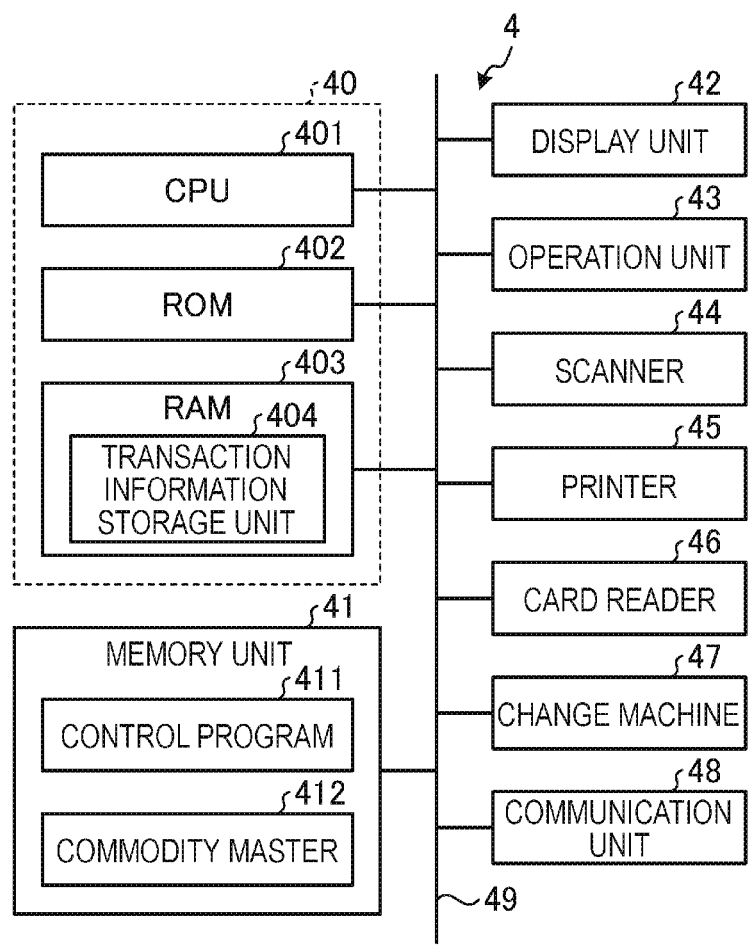
FIG. 7 is a block diagram illustrating a hardware configuration of a self-service POS terminal.

FIG. 7 is a block diagram illustrating a hardware configuration of the self-service POS terminal 4. The self-service POS terminal 4 includes a control unit 40, a memory unit 41, a display unit 42, an operation unit 43, a scanner 44, a printer 45, a card reader 46, a change machine 47, and a communication unit 48. The control unit 40, the memory unit 41, the display unit 42, the operation unit 43, the scanner 44, the printer 45, the card reader 46, the change machine 47, and the communication unit 48 are connected to each other via a bus 49 or the like.

The control unit 40 can be a computer provided with a CPU 401, a ROM 402, and a RAM 403. The CPU 401, ROM 402, and RAM 403 are connected to each other via the bus 49.

The CPU 401 controls the overall operation of the self-service POS terminal 4. The ROM 402 stores various programs such as a program used to drive the CPU 401 and various data. The RAM 403 includes a transaction information storage unit 404. The transaction information storage unit 404 is an area for storing transaction information including commodity information and the like read from a commodity master 412 described later, in one transaction, based on the input commodity code. Further, the RAM 403 is used as a work area of the CPU 401, and various programs and various data stored in the ROM 402 or the memory unit 41 are loaded in the RAM 403. The control unit 40 executes various control processes of the self-service POS terminal 4 by operating the CPU 401 according to a control program stored in the ROM 402 or the memory unit 41 and loaded in the RAM 403.

The memory unit 41 is a storage medium such as an HDD or a flash memory, and maintains the stored contents even when power is interrupted. The memory unit 41 stores a control program 411 and the commodity master 412.

The control program 411 is a program that causes the self-service POS terminal 4 to function as the commodity registration device, a program that causes the self-service POS terminal 4 to function as the accounting device, and the like. As described above, the commodity master 412 is a master file in which the commodity code, which is the commodity identifying information, and the commodity information (commodity name, price, and the like) are correlated with each other for the commodities handled in the store. The self-service POS terminal 4 receives a commodity master from the store server 2 and stores the commodity master in the memory unit 41.

The display unit 42 is, for example, a liquid crystal panel, and displays various information. The display unit 42 displays, for example, the commodity information of the registered commodity, a total price of the registered commodities, and the like. Further, the display unit 42 displays various information such as an operator for the customer who is the user to operate.

The operation unit 43 is, for example, a touch panel provided on a surface of the display unit 42, and outputs information according to a position touched by the user to the control unit 40. When the customer selects a button or key displayed on the display unit 42, the operation unit 43 outputs information corresponding to the operator to the control unit 40. The buttons/keys displayed on the display unit 42 include, for example, an operation button for inputting a commodity code, an operation button for finishing commodity registration and instructing the accounting process, and the like.

The scanner 44 optically images and recognizes a code symbol such as the barcode attached to the commodity purchased by the customer. Then, the scanner 44 decodes the recognized code symbol and reads the commodity code indicated by the code symbol. The scanner 44 inputs the read commodity code to the control unit 40. The code symbol recognized by the scanner 44 may be decoded by the control unit 40.

The printer 45, the card reader 46, and the change machine 47 have generally the same configurations and functions as the printer 34, the card reader 35, and the change machine 36 of the accounting device 3.

The communication unit 48 is an interface for communicating with the external device such as the store server 2, the accounting device 3, and the gate device 5. By being connected to the external device via the communication unit 48, the control unit 40 can transmit and receive information (data) to and from the external device.

Figure 8:
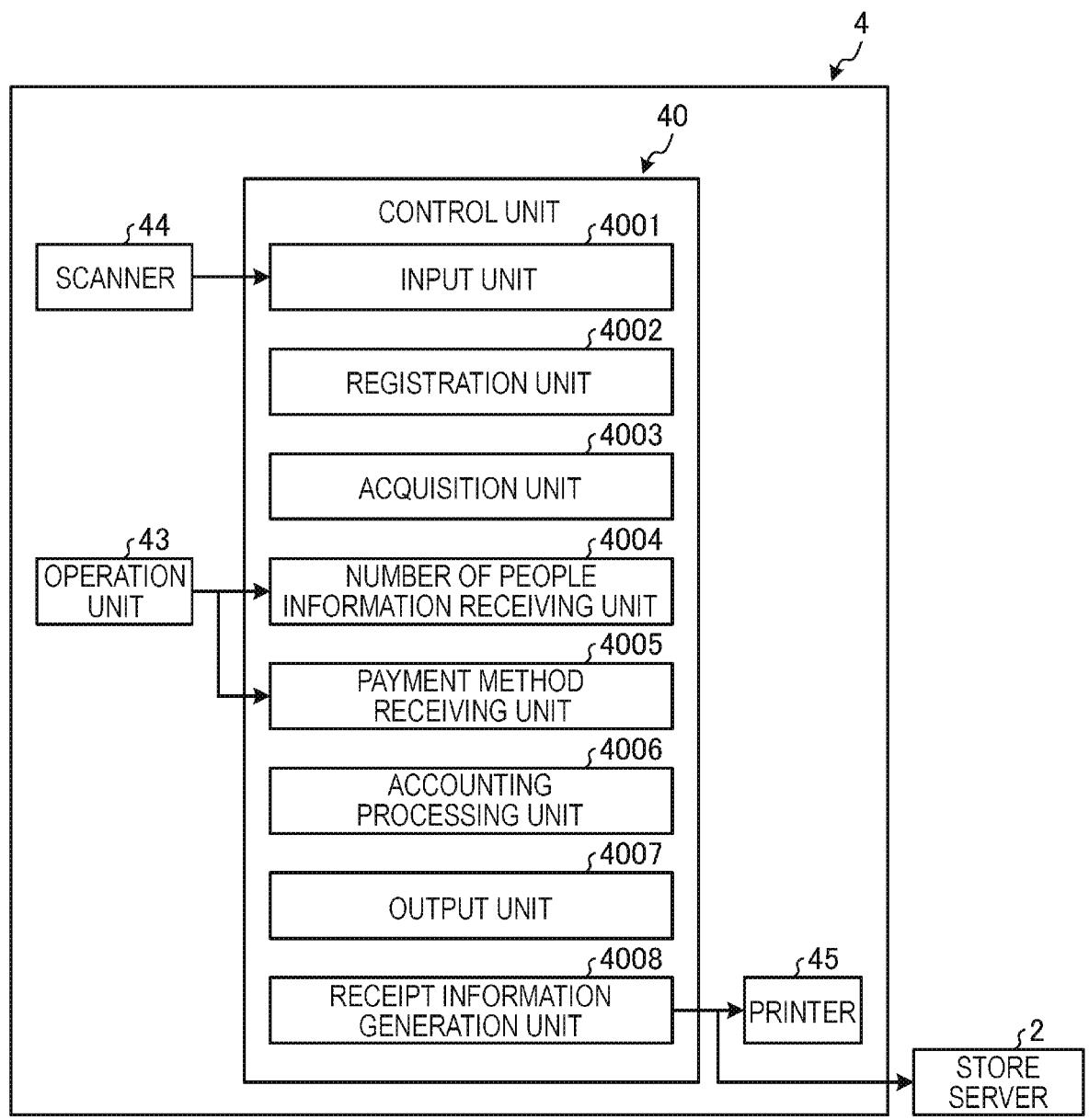
FIG. 8 is a block diagram illustrating a functional configuration of a self-service POS terminal.

Subsequently, the functional configuration of the control unit 40 of the self-service POS terminal 4 will be described. FIG. 8 is a block diagram illustrating a main functional configuration of the control unit 40 of the self-service POS terminal 4. By operating the CPU 401 according to the control program stored in the ROM 402 or the memory unit 41, the control unit 40 functions as an input unit 4001, a registration unit 4002, an acquisition unit 4003, a number of people information receiving unit 4004, a payment method receiving unit 4005, an accounting processing unit 4006, an output unit 4007, and a receipt information generation unit 4008. Further, each of these functions may be configured by hardware such as a dedicated circuit.

The commodity code read from the barcode on the commodity using the scanner 44 is sent to the input unit 4001. The commodity code is commodity identifying information that specifies the commodity.

The registration unit 4002 reads the commodity information corresponding to the commodity code sent to the input unit 4001 from the commodity master 412, and registers the read commodity information in the transaction information storage unit 404. With this process, commodity registration is executed.

The acquisition unit 4003 acquires the transaction information of one transaction. Specifically, when the payment method receiving unit 4005 receives the payment method information, the acquisition unit 4003 reads the transaction information from the transaction information storage unit 404 and acquires the transaction information.

The number of people information receiving unit 4004 receives the number of people information corresponding to the transaction information acquired by the acquisition unit 4003. Specifically, the number of people information receiving unit 4004 receives the number of people information input by the operation of the operation unit 43 by the customer.

The payment method receiving unit 4005 receives the payment method information input by the customer on condition that the number of people information receiving unit 4004 has received the number of people information. Specifically, when the number of people information receiving unit 4004 receives the number of people information, the payment method receiving unit 4005 receives the payment method information input by the operation of the operation unit 43. The customer can select, as the payment method, cash settlement and various cashless settlements such as credit settlement, and the like. Similar to the case of the accounting device 3 and the portable terminal 6, when the payment method information is input while the number of people information receiving unit 4004 has not received the number of people information, the payment method receiving unit 4005 displays an error message on the display unit 42. Further, the payment method receiving unit 4005 also receives a receipt issuance method.

The accounting processing unit 4006 executes the accounting processing based on the transaction information acquired by the acquisition unit 4003. The accounting processing unit 4006 displays, for example, the transaction information acquired by the acquisition unit 4003 on the display unit 42. Further, when the customer makes a payment by cash settlement, the accounting processing unit 4006 controls the change machine 47 to pay out the change. When the customer makes a payment by credit settlement, the accounting processing unit 4006 reads the credit information by the card reader 46. Then, the accounting processing unit 4006 transmits and receives various information related to credit settlement to and from the settlement server 110 via the store server 2, the management server 100, and the like.

When the accounting processing unit 4006 executes the accounting processing based on the transaction information, the output unit 4007 outputs the payment completion information indicating that the payment related to the transaction information is completed and the number of people information received by the number of people information receiving unit 4004. Specifically, when the accounting processing by the accounting processing unit 4006 is completed, the output unit 4007 outputs the payment completion information and the number of people information to the receipt information generation unit 4008. The payment completion information is information indicating that the customer's payment has been completed, for example, the accounting processing has been performed with the self-service POS terminal 4, and is, for example, a transaction No. issued by the self-service POS terminal 4. Similar to the output unit 3005 of the accounting device 3, the output unit 4007 may output the payment completion information and the number of people information to the printer 34 or the store server 2.

The receipt information generation unit 4008 generates receipt information for issuing a receipt. Specifically, the receipt information generation unit 4008 generates receipt information including the transaction information acquired by the acquisition unit 4003, and the payment completion information and the number of people information output by the output unit 4007. Similar to the receipt information generation unit 3006 of the accounting device 3, the receipt information generation unit 4008 outputs the receipt information to the printer 45 or the store server 2.

Figure 9:
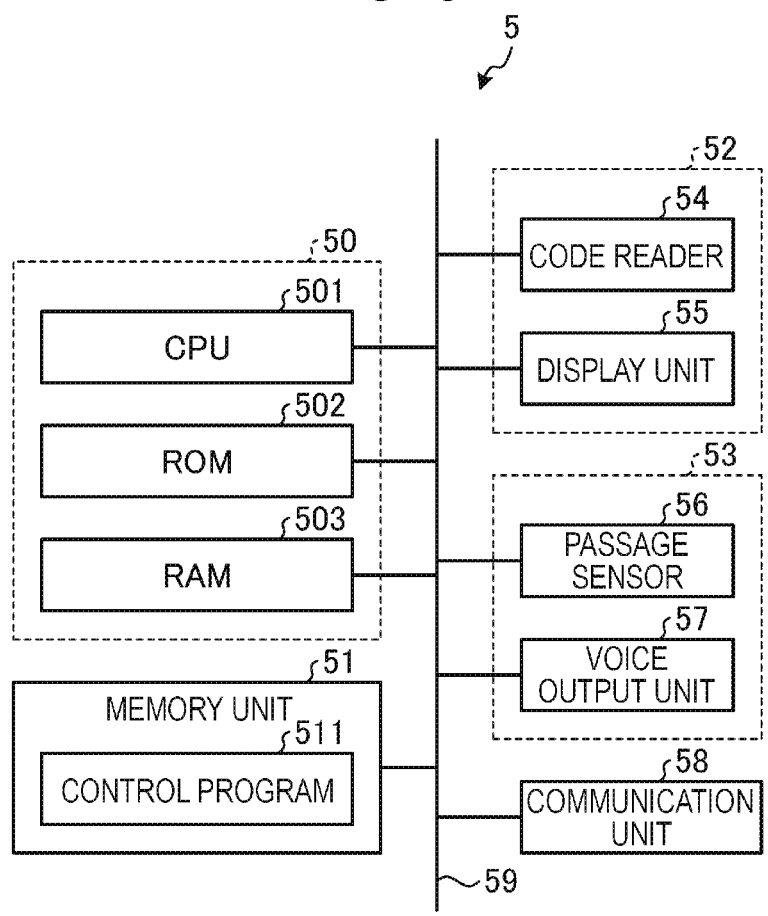
FIG. 9 is a block diagram illustrating a hardware configuration of a gate device.

FIG. 9 is a block diagram illustrating a hardware configuration of the gate device 5. The gate device 5 includes a control unit 50, a memory unit 51, the code reader 54, the display unit 55, the passage sensor 56, the voice output unit 57, and a communication unit 58. The code reader 54 and the display unit 55 are provided in the reading gate 52. Further, the passage sensor 56 and the voice output unit 57 are provided in the sensor gate 53. The control unit 50, the memory unit 51, the code reader 54, the display unit 55, the passage sensor 56, the voice output unit 57, and the communication unit 58 are connected to each other via a bus 59 or the like.

The control unit 50 can be a computer including a CPU 501, a ROM 502, and a RAM 503. The CPU 501, ROM 502, and RAM 503 are connected to each other via the bus 59.

The CPU 501 controls the overall operation of the gate device 5. The ROM 502 stores various programs such as a program used to drive the CPU 501 and various data. The RAM 503 is used as a work area of the CPU 501, and various programs and various data stored in the ROM 502 or the memory unit 51 are loaded in the RAM 503. By operating the CPU 501 according to a control program stored in the ROM 502 or the memory unit 51 and loaded in the RAM 503, the control unit 50 executes various control processes of the gate device 5.

The memory unit 51 is a storage medium such as an HDD or a flash memory, and maintains the stored contents even when power is interrupted. The memory unit 51 stores a control program 511.

The control program 511 is a program for reading a barcode that indicates the payment completion information and the number of people information, a program for notifying the number of people indicated by the read number of people information, and a program for detecting the number of people passing through the sensor gate 53 based on sensor information of the passage sensor 56.

The code reader 54 reads information from the barcode printed on the receipt or the barcode included in the electronic receipt displayed on the customer terminal. The code reader 54 decodes the recognized barcode and reads the payment completion information and the number of people information. The barcode recognized by the code reader 54 may be decoded by the control unit 50.

Figure 11:
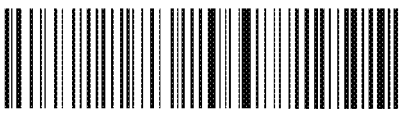
FIG. 11 is a diagram illustrating a receipt.

FIG. 11 is a diagram illustrating an example of a receipt on which a barcode is printed. The receipt has a transaction information area A and a barcode area B. In the transaction information area A, a commodity name, a price, a subtotal amount that is a sum of prices, a tax amount, a total amount, and the like of the commodity purchased by the customer are printed. In the barcode area B, a barcode indicating information including payment completion information and number of people information is printed.

The barcode printed in the barcode area B is composed of, for example, 16 digits data. The first 6 digits indicates the transaction date and time, the next 2 digits indicates the number of customers, the next 4 digits indicates the cash register No. that specifies a device with which the accounting processing is performed (accounting device 3 or self-service POS terminal 4), and the last 4 digits indicates the transaction No. The code indicating the number of customers is an example of the number of people information, and the code indicating the transaction No. is an example of the payment completion information. The code indicating the transaction No. is also an example of transaction specifying information that specifies the transaction. The transaction No. may be assigned for each cash register No., and the transaction specifying information may be composed of the cash register No. and the transaction No.

Referring back to FIG. 9, hardware of the gate device 5 will be described. The display unit 55 is, for example, a liquid crystal panel, and displays various information. The display unit 55 counts down the number of people who can pass through the gate device 5 based on, for example, the number of people information read by the code reader 54 and the number of people detected by the passage sensor 56.

The passage sensor 56 detects people passing through the sensor gate 53 and leaves the accounting area. As the passage sensor 56, a widely known sensor such as optically detecting people who pass through the sensor gate 53 can be used.

The voice output unit 57 is a speaker or the like, and notifies a customer or an attendant AT of information. For example, when the code reader 54 reads the number of people information, the voice output unit 57 notifies the surroundings of the number of people indicated by the number of people information as the number of passable people. The voice output unit 57 is an example of a notification unit.

The communication unit 58 is an interface for communicating with the external device such as the store server 2, the accounting device 3, and the self-service POS terminal 4. By being connected to the external device via the communication unit 58, the control unit 50 can transmit and receive information (data) to and from the external device.

Figure 10:
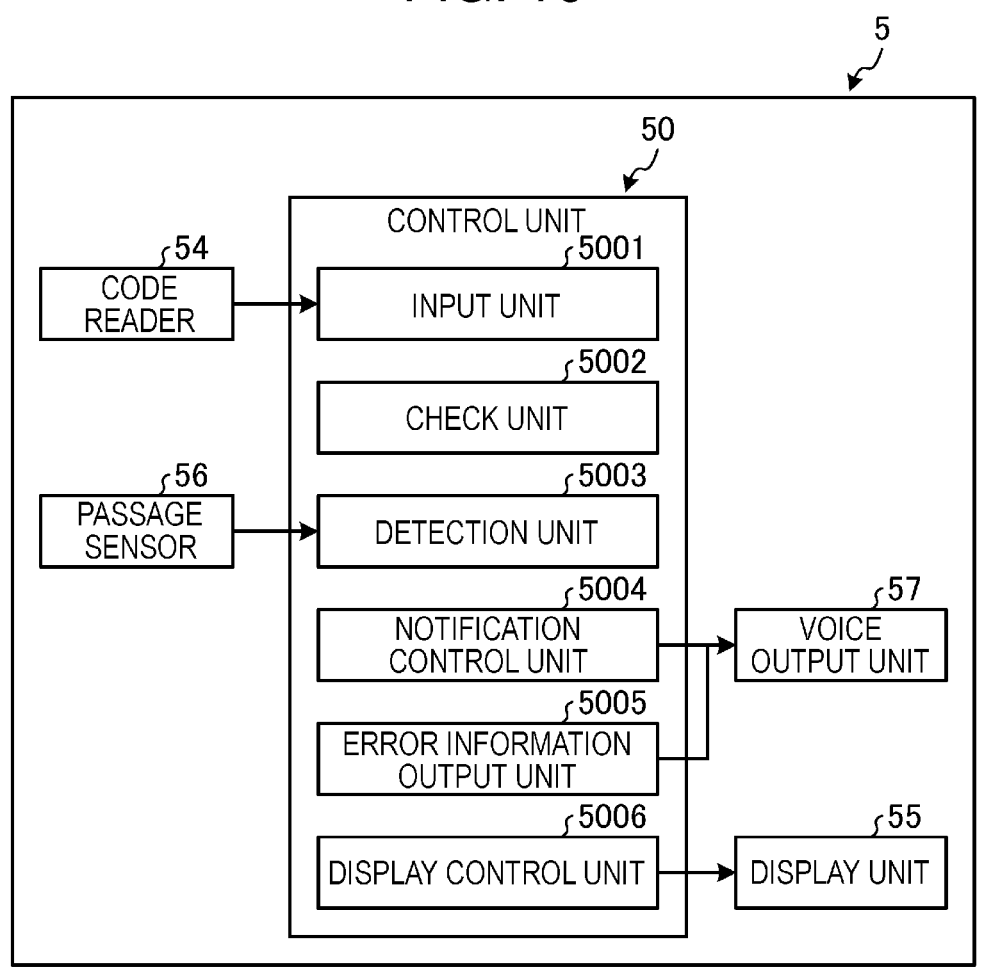
FIG. 10 is a block diagram illustrating a functional configuration of a gate device.

Subsequently, the functional configuration of the control unit 50 of the gate device 5 will be described. FIG. 10 is a block diagram illustrating a main functional configuration of the control unit 50 of the gate device 5. By operating the CPU 501 according to the control program stored in the ROM 502 or the memory unit 51, the control unit 50 functions as an input unit 5001, a check unit 5002, a detection unit 5003, a notification control unit 5004, an error information output unit 5005, and a display control unit 5006. Further, each of these functions may be configured by hardware such as a dedicated circuit.

The payment completion information and the number of people information from output units of the accounting device 3, the self-service POS terminal 4, or the portable terminal 6 are sent to the input unit 5001. The payment completion information and the number of people information as read by the code reader 54 from the barcode of the paper receipt or the electronic receipt are sent to the input unit.

The check unit 5002 checks whether or not the payment completion information sent to the input unit 5001 is correct. For example, the check unit 5002 checks the transaction completion information by inquiry to the store server 2 whether or not the transaction No. input as the payment completion information to the input unit 5001 is related to a transaction at the store.

The detection unit 5003 detects the number of customers passing through the gate device 5. Specifically, the detection unit 5003 detects the number of people passing through the gate device 5 and leaving the accounting area based on the output of the passage sensor 56.

The notification control unit 5004 causes a notification unit to indicate the number of people corresponding to the number of people information sent to the input unit 5001 as the number of passable people for the payment completion information sent to the input unit 5001. Specifically, in this example, the notification control unit 5004 causes the voice output unit 57 to output the number of people indicated by the number of people information sent to the input unit 5001 along with the payment completion information to notify the surroundings.

When the number of passing people for the payment completion information detected by the detection unit 5003 exceeds the number of people indicated by the number of people information, the error information output unit 5005 outputs error information. Specifically, by outputting the error information to the voice output unit 57, the error information output unit 5005 causes the voice output unit 57 to output an error message, for example, a voice saying "Please hold the barcode in the code reader". An output destination of the error information is not limited to the voice output unit 57, and may be another type notification device for notifying the error information, for example, a separate display device.

The display control unit 5006 causes the display unit 55 to display the number of passable people based on the number of people information sent to the input unit 5001 and the number of people detected by the detection unit 5003.

For example, the display control unit 5006 controls the display unit 55 to cause the display unit 55 to perform the following display. First, when the number of people information is sent from the code reader 54 to the input unit 5001, the display control unit 5006 causes the display unit 55 to display the number of people indicated by the number of people information. The display control unit 5006 reduces the number of people displayed on the display unit 55 each time the customer passes through the sensor gate 53 and leaves the accounting area from that state. In other words, the display control unit 5006 causes the display unit 55 to perform a countdown display on the number of passable people.

Figure 12:
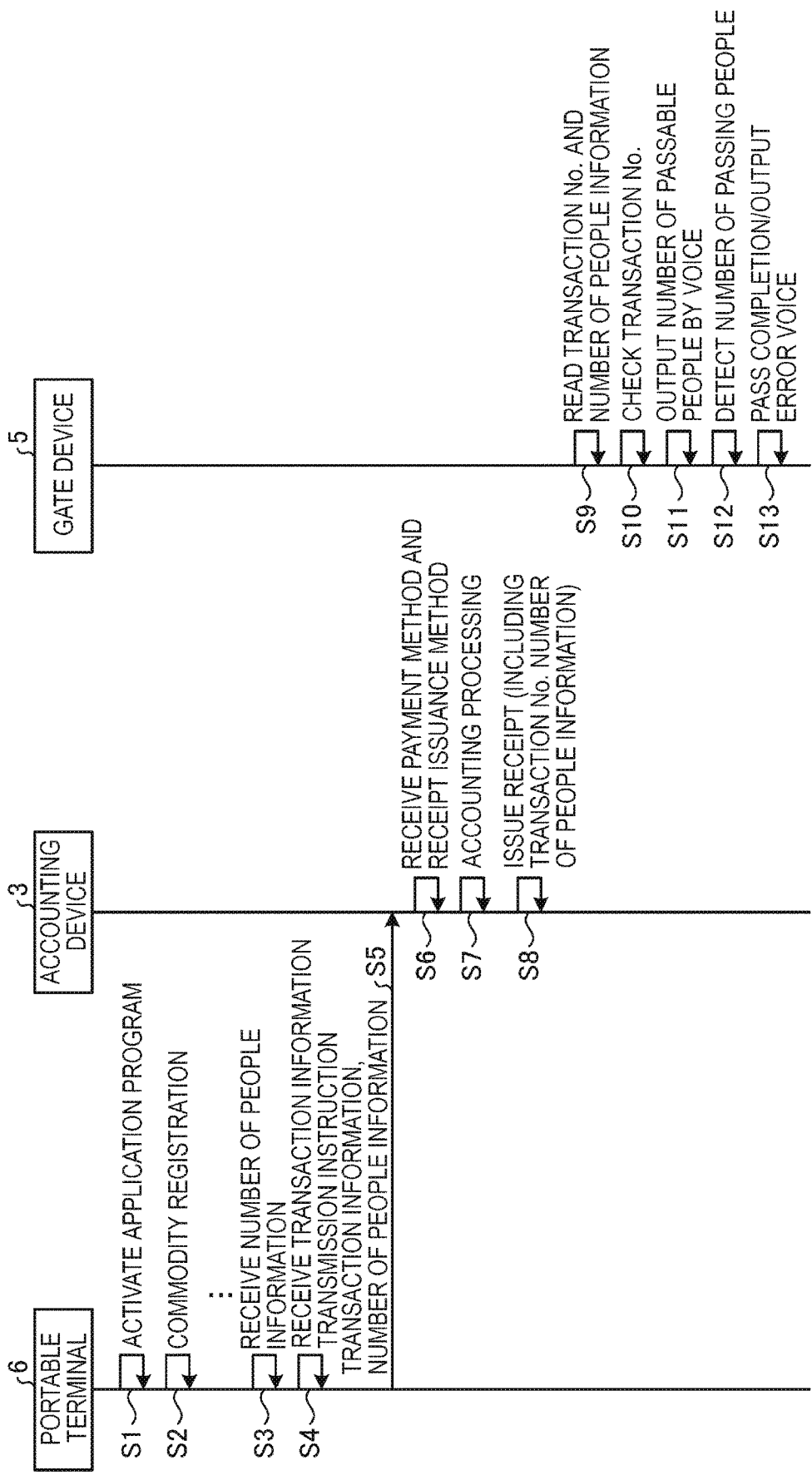
FIG. 12 is a sequence chart illustrating an example of an operation of a sales area management system.

Next, operations of the sales area management system 1 will be described. In the following description, an example in which a customer terminal such as a smartphone owned by the customer is used as the portable terminal 6 will be described. FIG. 12 is a sequence chart illustrating a flow of operations when the customer performs commodity registration with the portable terminal 6, makes a payment with the accounting device 3, and then passes through the gate device 5, and leaves the accounting area.

First, when a customer enters a store and, for example, reads a two-dimensional code for entering the store presented in the store with the portable terminal 6, the shopping application program is activated (S1). The customer may activate the shopping application program by operating the portable terminal 6. Next, the portable terminal 6 performs commodity registration for the commodity that the customer intends to purchase (S2). When the commodity registration of all the commodities that the customer intends to purchase is finished, the portable terminal 6 receives the number of people information input by the customer's operation (S3).

Subsequently, the portable terminal 6 receives a transaction information transmission instruction input by the customer's operation (S4). The portable terminal 6 can receive, for example, the transaction information transmission instruction by receiving an input based on an operation of the operation unit 63 by the customer, or by reading the payment code for transferring the transaction data from the image of the barcode displayed on the accounting device 3. The portable terminal 6 transmits the transaction information stored in the transaction information storage unit 604 and the number of people information input by the customer to the accounting device 3 (S5).

The accounting device 3 that has received the transaction information and the number of people information receives the payment method and a receipt issuance method (S6). The accounting device 3 executes accounting processing according to a received accounting method, for example, the accounting processing related to cash settlement or the accounting processing related to credit settlement (S7). Further, the accounting device 3 issues a paper receipt or an electronic receipt according to the received receipt issuance method (S8). The receipt issued includes a barcode indicating a transaction No. which is the payment completion information and transaction specifying information, and the number of people information. In the following description, when the paper receipt and the electronic receipt are not distinguished, they may be simply referred to as a receipt.

When the customer finishes the payment with the accounting device 3, the customer passes through the gate device 5 and leaves. When the customer leaves, the gate device 5 reads the transaction No. and the number of people information from the barcode on the receipt (S9). The gate device 5 checks the read transaction No. (S10) and outputs the number of passable people by voice (S11). The number of passable people is the number of people indicated by the number of people information read. After that, the gate device 5 detects the number of customers passing through the sensor gate 53 (S12), waits until the next transaction No. and the number of people information are read when the number of passable people has passed, and outputs an error message by voice when the passage of the customer is detected before the next reading (S13).

By the operations as described above, not only can a customer who has not completed the payment be prevented from leaving the store, but also all the customer groups can normally leave the accounting area even if multiple customer groups enter the accounting area. Further, by notifying the surrounding customers or the attendant AT of the number of customers (one customer or group customer) in one transaction leaving the accounting area, it is possible to prevent other customers from improperly leaving the accounting area when the other customers leave the accounting area. This is because by identifying the number of customers associated with a transaction, it can be expected that the surrounding customers will be encouraged to wait to leave until the corresponding number of other customers pass through the gate device 5. The attendant AT can monitor the customer(s) who seems to be different from a target customer who passes through the gate device 5 so that such other customers do not pass through the gate device 5. With this configuration, even if there are a plurality of customer groups present in the accounting area, each of the customers can smoothly leave the accounting area.

Figure 13:
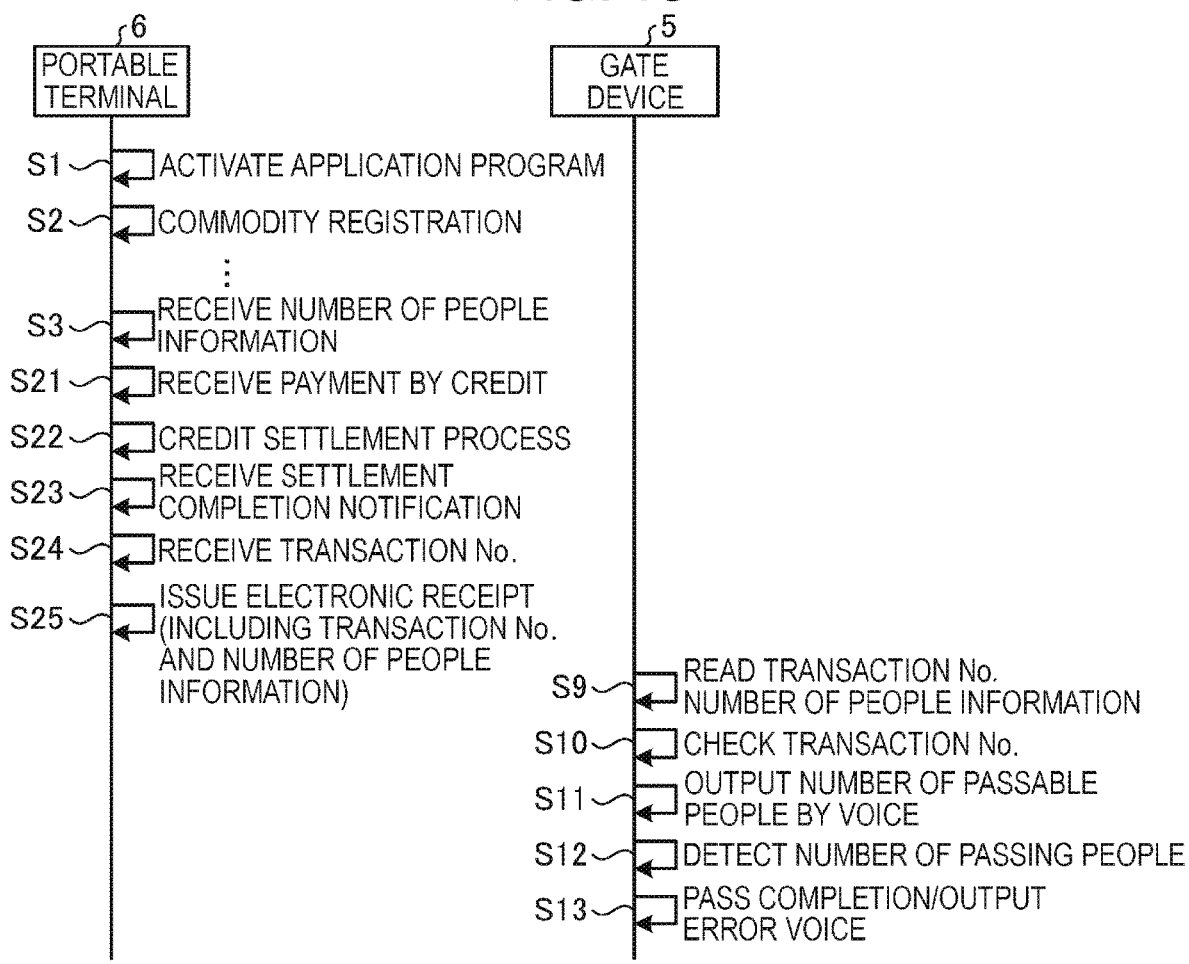
FIG. 13 is a sequence chart illustrating another example of an operation of a sales area management system.

An example case where a customer makes a payment using a portable terminal 6 without using an accounting device 3 will be described. FIG. 13 is a sequence chart illustrating a flow of operations when a customer passes through the gate device 5 and leaves the accounting area after performing commodity registration and making a payment with the portable terminal 6. Since the processing related to the commodity registration of the portable terminal 6 and the gate device 5 are the same as those in FIG. 12, the same reference numerals are given and the redundant description will be omitted.

Following the reception (S3) of the number of people information, the portable terminal 6 receives payment by credit settlement (S21). The credit settlement using the portable terminal 6 is possible only for the customer whose credit information is registered in the management server 100. When the payment by credit settlement is received, the portable terminal 6 executes a credit settlement process, which is an accounting processing (S22). Transmitting and receiving information to and from the settlement server 110 regarding the credit settlement are performed via the store server 2 and the management server 100. With this configuration, the store server 2 can also acquire transaction information for transactions for which the credit settlement is made by the portable terminal 6.

When the settlement by the settlement server 110 is completed, the portable terminal 6 receives a settlement completion notification from the settlement server 110 (S23). The portable terminal 6 also receives the transaction No. issued by the store server 2 from the store server 2 (S24). Subsequently, the portable terminal 6 issues and displays the electronic receipt (S25).

When the customer finishes the payment by credit settlement, the barcode included in the electronic receipt displayed on the portable terminal 6 is read by the gate device 5. The gate device 5 executes the processes S9 to S13 similarly as in the case of FIG. 12. By the operations described above, even if the customer completes the payment with the portable terminal 6, the same advantages as in the case of the operations illustrated in FIG. 12 can be obtained.

Figure 14:
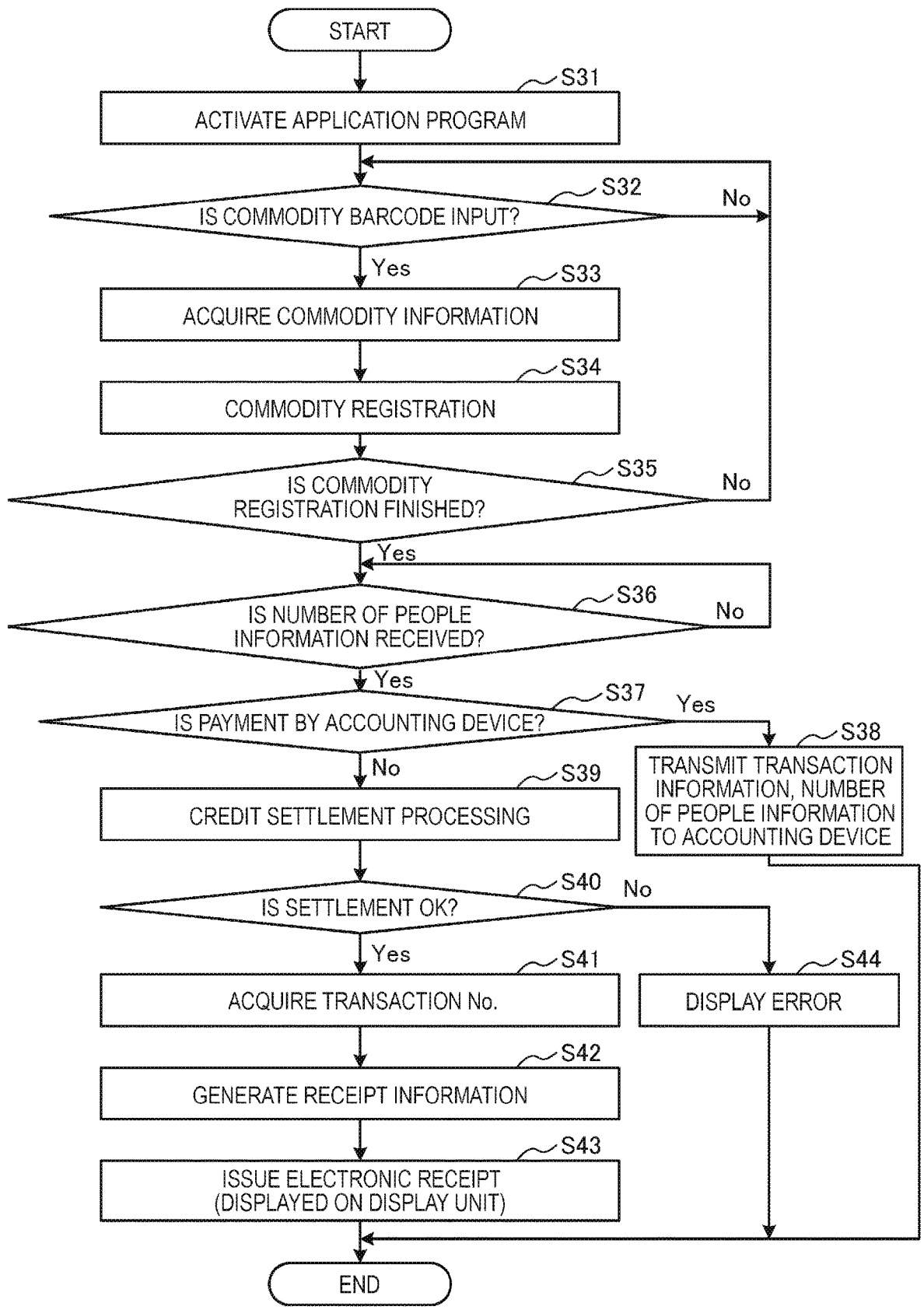
FIG. 14 is a flowchart illustrating a processing flow of a control unit of a portable terminal.

Next, processes executed by each device will be described. First, a process executed by the portable terminal 6 will be described. FIG. 14 is a flowchart illustrating a processing flow by the control unit 60 of the portable terminal 6.

First, the control unit 60 activates a shopping application program (S31), determines whether or not imaged data of the barcode attached to the commodity has been sent to the input unit 6001 (S32), and when the imaged data is not sent (N in S32), the control unit 60 returns to the process of S32 and waits. When the imaged data of the barcode attached to the commodity is sent to the input unit 6001 (Y in S32), the commodity information acquisition unit 6002 acquires commodity information from the store server 2 based on the commodity code indicated by the barcode (S33). The registration unit 6003 executes the commodity registration by storing the commodity information acquired by the commodity information acquisition unit 6002 in the transaction information storage unit 604 (S34).

Subsequently, the control unit 60 determines whether the commodity registration is finished (S35), and when the information indicating the commodity registration has been finished is not yet received (N in S35), the control unit 60 returns to the process of S32. When information indicating the commodity registration has been finished is received (Y in S35), the control unit 60 next determines whether or not the number of people information receiving unit 6005 has received the number of people information (S36). When the number of people information receiving unit 6005 has not received the number of people information (N in S36), the control unit 60 returns to the process of S36 and waits. When the number of people information is received (Y in S36), it is next determined whether or not the payment method received by the payment method receiving unit 6006 is payment by the accounting device 3 (S37).

When the customer selects payment with the accounting device 3 (Y in S37), the transaction information transmitting unit 6007 transmits the transaction information stored in the transaction information storage unit 604 and the number of people information received by the number of people information receiving unit 6005 to the accounting device 3 (S38). In this case, to enable credit settlement without using a credit card with the accounting device 3, the customer ID may also be transmitted to the accounting device 3. Then, the control unit 60 ends the process. With this configuration, the customer can make a payment with the accounting device 3.

In the process of S37, when the payment method selected by the customer is not the payment with the accounting device 3 (N in S37), in other words, when the payment by credit settlement by the portable terminal 6 is selected, the accounting processing unit 6008 executes the credit settlement process (S39). The control unit 60 determines whether or not the information received from the settlement server 110 is information to the fact the payment has been completed, that is, the settlement is OK (S40). When the settlement is OK (Y in S40), the output unit 6009 acquires the transaction No. from the store server 2 (S41) and outputs the transaction No. to the receipt information generation unit 6010 together with the number of people information.

The receipt information generation unit 6010 generates receipt information based on the transaction No. and the number of people information sent from the output unit 6009 and the transaction information stored in the transaction information storage unit 604 (S42). The display unit 62 displays the electronic receipt based on the receipt information generated by the receipt information generation unit 6010. That is, an electronic receipt is issued. Then, the control unit 60 ends the process. In the process of S40, when the credit settlement is not OK, that is, when the credit settlement is not executed, the control unit 60 causes the display unit 62 to display an error and ends the process.

By the processes described above, the portable terminal 6 functions as the commodity registration device for registering commodity information of the commodity purchased by the customer. Further, the portable terminal 6 is used as the accounting device that makes a payment by credit settlement and generates receipt information including the payment completion information and number of people information.

Subsequently, the process executed by the accounting device 3 will be described. FIG. 15 is a flowchart illustrating a processing flow by the control unit 30 of the accounting device 3.

The control unit 30 determines whether or not the acquisition unit 3001 has acquired the transaction information and the number of people information from the portable terminal 6 (S51), and when the information is not acquired (N in S51), the control unit 30 returns to the process of S51 and waits. When the acquisition unit 3001 acquires the transaction information and the number of people information (Y in S51), the control unit 30 determines whether or not the payment method receiving unit 3004 has received the payment method (S52), and when the payment method is not received (N in S52), the control unit 30 returns to the process of S52 and waits.

When the payment method receiving unit 3004 receives the payment method (Y in S52), the accounting processing unit 3002 executes the accounting processing in the payment method received by the payment method receiving unit 3004 such as cash settlement and credit settlement (S53). Subsequently, the receipt information generation unit 3006 generates receipt information based on the transaction information and the number of people information acquired by the acquisition unit 3001 and the transaction No. issued by the control unit 30 when the accounting processing is completed (S54).

Next, the control unit 30 determines whether or not the receipt issuance method received by the payment method receiving unit 3004 together with the payment method is an electronic receipt issuance instruction (S55). When it is the electronic receipt issuance instruction (Y in S55), the receipt information generation unit 3006 outputs the generated receipt information to the store server 2. Then, the control unit 30 ends the process. When it is not the electronic receipt issuance instruction (N in S55), that is, when it is a paper receipt issuance instruction, the receipt information generation unit 3006 outputs the generated receipt information to the printer 34. Then, the control unit 30 ends the process.

By the processes described above, the accounting device 3 executes the accounting processing for the customer to make a payment, and also generates receipt information including the payment completion information and number of people information.

Subsequently, a process executed by the gate device 5 will be described. FIG. 16 is a flowchart illustrating a processing flow by the control unit 50 of the gate device 5.

The control unit 50 determines whether or not code information including the payment completion information and the number of people information has been sent to the input unit 5001 (S61), and when the code information is not yet received (N in S61), the control unit 50 returns to the process of S61 and waits. When the code information is sent to the input unit 5001 (Y in S61), the check unit 5002 checks whether or not the input code information includes the payment completion information indicating that the payment has been completed correctly (S62).

When the payment has been made correctly (Y in S62), the notification control unit 5004 controls the voice output unit 57 to output a notice regarding the number of passable people, that is, the number of people indicated by the number of people information sent to the input unit 5001. Next, the detection unit 5003 starts counting up the number of people passing through the sensor gate 53 (S64). The display control unit 5006 controls the display unit 55 to count down and display the remaining number of passable people based on the number of people information sent to the input unit 5001 and the number of passing people detected by the detection unit 5003 (S65).

Subsequently, the control unit 50 determines whether or not it is still within the passable time for the customer group who had the code reader 54 read a barcode, in other words, within the predetermined time after outputting the number of passable people by voice in the process of S63 (S66). When it is still within the passable time (Y in S66), the control unit 50 determines whether or not the number of people detected by the detection unit 5003 exceeds the number of passable people (S67).

When the number of people detected by the detection unit 5003 exceeds the number of passable people (Y in S67), the error information output unit 5005 outputs error information to the voice output unit 57 (S68). With this configuration, the voice output unit 57 outputs an error message such as "Please hold the barcode to the code reader". Next, the detection unit 5003 finishes counting up the number of detected people (S69). Then, the control unit 50 ends the process.

In the process of S62, when the code information sent to the input unit 5001 does not include the payment completion information indicating the payment has been completed correctly (N in S62), the display control unit 5006 controls the display unit 55 to display an error. In the error display, for example, "Please hold the barcode of the receipt issued by payment to the code reader" is displayed. Then, the control unit 50 ends the process.

Further, in the process of S66, when it is no longer within the passable time (N in S66), the control unit 50 skips the process of S67 and proceeds to the process of S68. In the process of S67, when the number of people detected by the detection unit 5003 does not exceed the number of passable people (N in S67), the control unit 50 determines whether or not the number of detected people by the detection unit 5003 is the same as the number of passable people (S71). When the number of detected people and the number of passable people are the same (Y in S71), the control unit 50 proceeds to the process of S69, and when the number of detected people and the number of passable people are not the same (N in S71), the process returns to the process of S65.

By the processes described above, the gate device 5 notifies the customers and attendant ATs around the gate device 5 of the number of customers in a group who have had the code reader 54 read the barcode. Further, when the customers who exceed the number of people indicated by the input number of people information pass through, the gate device 5 outputs error information.

Subsequently, the process executed by the self-service POS terminal 4 will be described. FIG. 17 is a flowchart illustrating a processing flow by the control unit 40 of the self-service POS terminal 4.

The control unit 40 determines whether or not a commodity code has been sent to the input unit 4001 (S81), and when a commodity code is not sent, the control unit 40 returns to the process of S81 and waits. When the commodity code is received (Y in S81), the registration unit 4002 reads the commodity information corresponding to the sent commodity code from the commodity master 412 and stores the commodity information in the transaction information storage unit 404 to execute the commodity registration (S82).

Subsequently, the control unit 40 determines whether or not information indicating that the commodity registration is finished has been received (S83), and when such information is not yet received (N in S83), the control unit 40 returns to the process of S81. When the information indicating that the commodity registration is finished has been sent (Y in S83), the control unit 40 determines whether or not the number of people information receiving unit 4004 has received the number of people information (S84). When the number of people information is not received (N in S84), the control unit 40 returns to the process of S84 and waits. When the number of people information receiving unit 4004 receives the number of people information (Y in S84), the control unit 40 determines whether or not the payment method receiving unit 4005 has received the payment method (S85), and when the payment method is not received (N in S85), the control unit 40 returns to the process of S85 and waits.

When the payment method receiving unit 4005 receives the payment method (Y in S85), the accounting processing unit 4006 executes the accounting processing in the payment method received by the payment method receiving unit 4005 such as cash settlement and credit settlement (S86). Subsequently, the receipt information generation unit 4008 generates receipt information based on the transaction information acquired by the acquisition unit 4003 from the transaction information storage unit 404, the number of people information received by the number of people information receiving unit 4004, and the transaction No. issued by the control unit 40 issued when the accounting processing is completed (S87).

Next, the control unit 40 determines whether or not the receipt issuance method received by the payment method receiving unit 4005 together with the payment method is the electronic receipt issuance instruction (S88). When the receipt issuance method is the electronic receipt issuance instruction (Y in S88), the receipt information generation unit 4008 outputs the generated receipt information to the store server 2. Then, the control unit 40 ends the process. When the receipt issuance method is not the electronic receipt issuance instruction (N in S88), that is, when it is a paper receipt issuance instruction, the receipt information generation unit 4008 outputs the generated receipt information to the printer 45. Then, the control unit 40 ends the process.

By the processes described above, the self-service POS terminal 4 functions as the commodity registration device for registering the commodity information of the commodity purchased by the customer. Further, the self-service POS terminal 4 is used as the accounting device that executes the accounting processing for the customer to make a payment and generates the receipt information including the payment completion information and the number of people information.

As described above, the sales management system of an embodiment includes an accounting device that executes accounting processing for a customer who purchases a commodity and a gate device through which the customer who has completed payment passes. The accounting device includes an acquisition unit that acquires transaction information of one transaction, an accounting processing unit that executes the accounting processing based on the transaction information acquired by the acquisition unit, a number of people information receiving unit that receives the number of people information corresponding to the transaction information acquired by the acquisition unit, and an output unit that outputs payment completion information indicating that payment related to the transaction information has been completed along with the number of people information received by the number of people information receiving unit. A gate device of the system includes an input unit into which the payment completion information and the number of people information output by the output unit are input, a detection unit that detects the number of customers passing through the gate device, a notification control unit that causes a notification unit to indicate the number corresponding to the number of people information, and an error information output unit that outputs error information when the number of passing detected by the detection unit exceeds the number of people indicated by the input number of people information.

With this configuration, not only can the customer who has not completed the payment be prevented from leaving the store, but customer groups can normally leave the accounting area. By notifying the surrounding customers or the attendant AT of the number of customers in one transaction (one customer group) that are leaving the accounting area, it is possible to prevent other customers not associated with the customer group from leaving the accounting area at an inappropriate time. Accordingly, even if there are a plurality of customers and/or customer groups in the accounting area, all the customers can smoothly leave the accounting area.

The accounting device can be a portable terminal owned by the customer in some examples. In such a case, the accounting processing unit executes a process related to cashless settlement, and the output unit outputs payment completion information along with number of people information to the display unit of the portable terminal.

With this configuration, when the customer makes a payment using the customer's own portable terminal, the customers can normally leave the accounting area without separately requiring the fixed accounting device or the like to output payment completion (and number of people) information or the like. Accordingly, it is possible to improve the convenience of the customer who makes a payment with the portable terminal.

The accounting device further includes a receipt information generation unit that generates receipt information for issuing a receipt, the payment completion information is transaction specifying information that identifies a transaction for which payment has been completed, and the receipt information includes the transaction specifying information and the number of people information.

With this configuration, a receipt issued for the transaction can be utilized as a medium for showing information for the gate device to check the normal exit of the customers. Furthermore, the transaction specifying information used for product return processing in which the customer who previously purchased a product but then returns the product can also be used as payment completion information for the gate device to check for the normal exit of the customer. Accordingly, the receipt information can be simplified.

Moreover, the receipt information generation unit may generate receipt information for issuing an electronic receipt that can be browsed on a customer terminal owned by the customer.

With this configuration, the electronic receipt can be utilized as a medium for showing information for the gate device to check for the normal exit of the customer. Accordingly, it is possible to avoid the customer from losing a printed receipt medium or the like.

In addition, the accounting device further includes a payment method receiving unit that receives information indicating a payment method selected by the customer, but on condition that the number of people information receiving unit has already received the number of people information.

With this configuration, it is necessary for the customer to first input the number of people information in order to make a payment, and forgetting to input the number of people information can be prevented. Accordingly, even if the customer is part of a customer group consisting of a plurality of people shopping together, the customer (and group) can leave normally.

In addition, the gate device further includes a display control unit that causes a display unit to display the remaining number of passable people based on the number of people information sent to the input unit with the number of people detected by the detection unit being subtracted from the initial value.

With this configuration, the customers in the accounting area can always know the number of people who can pass through the gate device in association with one transaction. Accordingly, the convenience of the customer can be improved.

In the embodiment described above, the control program executed by the accounting device 3, the self-service POS terminal 4, and the portable terminal 6 that function as an accounting device may be recorded on a non-transitory computer-readable recording medium such as a CD-ROM. Further, a control program executed by the accounting device 3, a self-service POS terminal 4, or a portable terminal 6 of the above embodiments may be stored on a computer connected to a network such as the Internet and downloaded via the network. The control programs may be configured to be provided and/or accessed via a network such as the Internet.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sales area management system, comprising:
   an accounting device configured to execute an accounting process for a customer purchasing a product in a sales transaction based on input operations by the customer; and
   a gate device through which customers pass after completing the accounting process, wherein
   the accounting device includes:
     an acquisition unit configured to acquire transaction information for the sales transaction, an accounting processing unit configured to execute the accounting processing based on the transaction information acquired by the acquisition unit, a people number receiving unit configured to receive people information indicating the number of people associated with the transaction information, and an output unit configured to output payment completion information indicating that payment related to the transaction information has been completed together with the people information received by the people number information receiving unit after the accounting processing unit completes the accounting processing, and the gate device includes:

an input unit configured to receive the payment completion information and the people information, a detection unit configured to detect people passing through the gate device, a notification control unit configured to causes a notification unit to indicate, before permitting a person to pass through the gate device, the number of people associated with the transaction based on the people information received by the input unit, the notification control unit further configured to cause the notification unit to indicate remaining number of people associated with the transaction to be permitted to pass through the gate device, the remaining number of people corresponding to the people information minus the number of people detected by the detection unit passing through the gate device, and an error information output unit configured to output error information when the number of people detected by the detection unit exceeds the number of people indicated by the people information.

2. The sales area management system according to claim 1, wherein the accounting device is a portable terminal, the accounting processing unit executes a process related to cashless settlement, and the output unit outputs the payment completion information and the people information to a display unit of the portable terminal.

3. The sales area management system according to claim 1, wherein the accounting device further includes a receipt information generation unit configured to generate receipt information for issuing a receipt, the payment completion information is transaction specifying information that identifies a transaction for which payment has been completed, and the receipt information includes the transaction specifying information and the people information.

4. The sales area management system according to claim 3, wherein the receipt information generation unit generates receipt information for issuing an electronic receipt.

5. The sales area management system according to claim 1, wherein the accounting device further includes a payment method receiving unit configured to receive information indicating a payment method selection from the customer only after the people information receiving unit has received the people information.

6. The sales area management system according to claim 1, wherein the gate device further includes a display control unit configured to cause a display unit to display the remaining number of people.

7. The sales area management system according to claim 1, wherein the input unit is a barcode reader.

8. The sales area management system according to claim 1, wherein the error information output unit outputs the error information to a speaker.

9. The sales area management system according to claim 1, wherein the accounting device is a self-service point-of-sale terminal.

10. The sales area management system according to claim 1, wherein the gate device includes a gate that open and closes an exit of a sales area in which the accounting device is located.

11. A sales area management system, comprising:

a gate device at an exit of a sales area; and a self-checkout device in the sales area and configured to permit a customer to make a payment for a sales transaction, wherein the self-checkout device is configured to:

receive the payment for the sales transaction, receive a user input indicating the number of people associated with the sales transaction, and output a transaction completion notice after the payment of the sales transaction is made, the transaction completion notice including a people number indicating the number of people associated with sales transaction, and the gate device is configured to:

acquire the transaction completion notice, before permitting a person to pass through the gate device, output a first notification indicating the people number associated with the transaction completion notice, detect the number of people passing the gate device to exit the sales area, and output a second notification indicating a value of the people number minus the detected number of people passing the gate device to exit the sales area.

12. The sales area management system according to claim 11, wherein the self-checkout device is a portable terminal.

13. The sales area management system according to claim 12, wherein the transaction completion notice is a visual code output to a display screen of the portable terminal.

14. The sales area management system according to claim 11, wherein the gate device includes a barcode reader, and the gate device acquires the transaction completion notice via the barcode reader.

15. The sales area management system according to claim 11, wherein the self-checkout device is a self-service point-of-sale terminal installed in the sales area.

16. The sales area management system according to claim 11, wherein the self-checkout device includes a printer, and the transaction completion notice is a barcode printed on a sales receipt by the printer.

17. The sales area management system according to claim 11, wherein the gate device outputs the first and second notifications to a display screen visible to the sales area.

18. The sales area management system according to claim 11, wherein the gate device outputs the first and second notification to a speaker.

19. The sales area management system according to claim 11, wherein the self-checkout device is configured to receive the payment for the sales transaction only after the user input indicating the number of people associated with the sales transaction is received.

20. The sales area management system according to claim 19, wherein the self-checkout device is a portable terminal.

* * * * *